(12) United States Patent
Macready et al.

(10) Patent No.: US 10,817,796 B2
(45) Date of Patent: Oct. 27, 2020

(54) SYSTEMS AND METHODS FOR MACHINE LEARNING

(71) Applicant: D-Wave Systems Inc., Burnaby (CA)

(72) Inventors: William G. Macready, West Vancouver (CA); Firas Hamze, Vancouver (CA); Fabian A. Chudak, Vancouver (CA); Mani Ranjbar, Burnaby (CA); Jack R. Raymond, Vancouver (CA); Jason T. Rolfe, Vancouver (CA)

(73) Assignee: D-WAVE SYSTEMS INC., Burnaby (CA)

( * ) Notice: Subject to any disclaimer, the term of this patent is extended or adjusted under 35 U.S.C. 154(b) by 807 days.

(21) Appl. No.: 15/452,438

(22) Filed: Mar. 7, 2017

(65) Prior Publication Data

US 2017/0255871 A1 Sep. 7, 2017

Related U.S. Application Data

(60) Provisional application No. 62/322,116, filed on Apr. 13, 2016, provisional application No. 62/304,737, filed on Mar. 7, 2016.

(51) Int. Cl.
| | | |
|---|---|---|
| *G06N 10/00* | (2019.01) | |
| *G06N 7/00* | (2006.01) | |
| *G06N 20/00* | (2019.01) | |
| *G06K 9/62* | (2006.01) | |
| *G06F 111/10* | (2020.01) | |

(52) U.S. Cl.
CPC ........... *G06N 10/00* (2019.01); *G06K 9/6277* (2013.01); *G06N 7/005* (2013.01); *G06N 20/00* (2019.01); *G06F 2111/10* (2020.01)

(58) Field of Classification Search
CPC ........ G06N 10/00; G06N 20/00; G06N 7/005; G06F 17/11
See application file for complete search history.

(56) References Cited

U.S. PATENT DOCUMENTS

| | | |
|---|---|---|
| 7,135,701 B2 | 11/2006 | Amin et al. |
| 7,418,283 B2 | 8/2008 | Amin |
| 7,533,068 B2 | 5/2009 | Maassen van den Brink et al. |
| 8,008,942 B2 | 8/2011 | van den Brink et al. |
| 8,190,548 B2 | 5/2012 | Choi |

(Continued)

OTHER PUBLICATIONS

Adachi et al., "Application of Quantum Annealing to Training of Deep Neural Networks," 2015, arXiv:1510.06356, pp. 1-18 (Year: 2015).*

(Continued)

*Primary Examiner* — Miranda M Huang
*Assistant Examiner* — Catherine F Lee
(74) *Attorney, Agent, or Firm* — Cozen O'Connor

(57) ABSTRACT

A hybrid computer comprising a quantum processor can be operated to perform a scalable comparison of high-entropy samplers. Performing a scalable comparison of high-entropy samplers can include comparing entropy and KL divergence of post-processed samplers. A hybrid computer comprising a quantum processor generates samples for machine learning. The quantum processor is trained by matching data statistics to statistics of the quantum processor. The quantum processor is tuned to match moments of the data.

12 Claims, 12 Drawing Sheets

(56) References Cited

U.S. PATENT DOCUMENTS

| | | |
|---|---|---|
| 8,195,596 B2 | 6/2012 | Rose et al. |
| 8,421,053 B2 | 4/2013 | Bunyk et al. |
| 10,339,466 B1 * | 7/2019 | Ding ................. G06N 20/00 |
| 2015/0161524 A1 | 6/2015 | Hamze |
| 2015/0269124 A1 | 9/2015 | Hamze et al. |

OTHER PUBLICATIONS

Bach et al., "On the Equivalence between Herding and Conditional Gradient Algorithms," *Proceedings of the 29th International Conference on Machine Learning*, 2012, 8 pages.

Chen et al., "Parametric Herding," *Proceedings of the 13th International Conference on Artificial Intelligence and Statistics (AISTATS)*, 2010, pp. 97-104.

Chen et al., "Herding as a Learning System with Edge-of-Chaos Dynamics," arXiv:1602.030142V2 [stat.ML], Mar. 1, 2016, 48 pages.

Grassberger, "Entropy Estimates from Insufficient Samplings," arXiv:physics/0307138v2 [physics.data-an], Jan. 4, 2008, 5 pages.

Hamze, "Sampling From a Set Spins With Clamping," U.S. Appl. No. 61/912,385, filed Dec. 5, 2013, 35 pages.

Jaakkola et al., "Improving the Mean Field Approximation Via the Use of Mixture Distributions," 1998, 11 pages.

Katzgraber et al., "Glassy Chimeras Could Be Blind to Quantum Speedup: Designing Better Benchmarks for Quantum Annealing Machines," *Physical Review X*(4):021008, 2014. (8 pages).

Paninski, "Estimation of Entropy and Mutual Information," *Neural Computation* 15:1191-1253, 2003.

Spall, "Multivariate Stochastic Approximation Using a Simultaneous Perturbation Gradient Approximation," *IEEE Transactions on Automatic Control* 37(3):332-341, 1992.

\* cited by examiner

SYSTEMS AND METHODS FOR MACHINE LEARNING

FIELD

This disclosure generally relates to systems, devices, methods, and articles that generate samples from a probability distribution, and to application of these samples, for example, in machine learning.

BACKGROUND

Machine Learning

Machine learning relates to methods that can learn from data and make predictions based on data. In contrast to methods that follow static program instructions, machine learning methods can include deriving a model from example inputs (such as a training set) and then making data-driven predictions.

Machine learning tasks can include unsupervised learning, supervised learning, and reinforcement learning. Approaches to machine learning include, but are not limited to, decision trees, linear and quadratic classifiers, case-based reasoning, Bayesian statistics, and artificial neural networks.

Machine learning can be used in situations where explicit methods are considered infeasible. Example application areas include optical character recognition, search engine optimization, and computer vision.

Generative and Discriminative Models

Generative learning and discriminative learning are two categories of approaches to machine learning. Generative approaches are based on models for a joint probability distribution over the observed and the target variables, whereas discriminative approaches are based on models for a conditional probability of the target variables given the observed variables.

Quantum Devices

Quantum devices are structures in which quantum mechanical effects are observable. Quantum devices include circuits in which current transport is dominated by quantum mechanical effects. Such devices include spintronics, and superconducting circuits. Both spin and superconductivity are quantum mechanical phenomena. Quantum devices can be used for measurement instruments, in computing machinery, and the like.

BRIEF SUMMARY

Sampling

Throughout this specification and the appended claims, the terms "sample", "sampling", "sampling device", and "sample generator" are used. These terms are used herein in like manner to their corresponding uses in the arts of statistics and statistical analysis, and electrical engineering.

In statistics, a sample is a subset of a population, such as a plurality of data points collected from a statistical population. In electrical engineering and related disciplines, sampling relates to collecting a plurality of measurements of an analog signal or some other physical system, for example, in a conversion of a continuous signal to a discrete signal.

In many fields, including simulations of physical systems, computing, especially analog computing, the foregoing meanings merge. A hybrid computer can draw samples from an analog computer acting as a sample generator. The analog computer can be operated to provide samples from a probability distribution, where the probability distribution assigns a respective probability of being sampled to each data point in the population.

An analog processor, such as a quantum processor, and in particular a quantum processor designed to perform quantum annealing and/or adiabatic quantum computation, may be operated as a sample generator, where the population can be possible states of the processor, and each sample can correspond to a state of the processor. Using an analog processor as a sample generator may be a preferred mode of operating the processor for certain applications. Operating an analog processor as a sample generator may also enable a broader range of problems to be solved compared to, for example, using an analog processor to find a low energy state of a Hamiltonian that encodes an optimization problem.

Importance Sampling

Importance sampling is a technique for estimating properties of a distribution of interest. The technique includes drawing samples from a different distribution (a proposal distribution), and weighting the samples, as needed, to recover the distribution of interest. A challenge in importance sampling is finding a suitable proposal distribution. A poor choice of proposal distribution will result in a large variance, which means a large number of samples must be drawn from the proposal distribution before the weighted set is representative of the target distribution. As the number of dimensions in the distribution increases, the challenge can become greater.

Markov Chain Monte Carlo

Markov Chain Monte Carlo is a class of computational techniques. A Markov chain may be used, for example when a probability distribution cannot be used. A Markov chain is a sequence of discrete random variables. When the chain is long enough the aggregate properties of the chain, for example, the mean, match the aggregate properties of a target distribution. The Markov chain can be obtained by proposing a new point according to a Markovian proposal process. New points can be accepted if the new points make for a probabilistic convergence to the target distribution.

Quantum Computation

A quantum computer is a system that makes direct use of at least one quantum-mechanical phenomenon, such as, superposition, tunneling, and entanglement, to perform operations on data. The elements of a quantum computer are qubits. Quantum computers can provide speedup for certain classes of computational problems such as computational problems simulating quantum physics. A quantum computer may include a quantum processor.

Quantum Processor

A quantum processor is a computing device that can harness quantum physical phenomena (such as superposition, entanglement, and quantum tunneling) unavailable to non-quantum devices. A quantum processor may take the form of a superconducting quantum processor.

A superconducting quantum processor may include a number of qubits and associated local bias devices, for instance two or more superconducting qubits. Superconducting qubits are solid state qubits based on circuits of superconducting materials. Superconducting effects in these circuits, such as magnetic flux quantization and Josephson tunneling, can give rise to different types of superconducting qubits including flux, phase, charge, and hybrid qubits.

A superconducting quantum processor may also employ coupling devices (i.e., "couplers") providing communicative coupling between qubits.

Further details and embodiments of exemplary quantum processors that may be used in conjunction with the present apparatus, systems, methods, and devices are described in, for example, U.S. Pat. Nos. 7,533,068; 8,008,942; 8,195,596; 8,190,548; and 8,421,053.

Quantum Annealing

Quantum annealing is a computational method that may be used to find a low-energy state of a system, typically preferably the ground state of the system. Similar in concept to classical simulated annealing, the method relies on the underlying principle that natural systems tend towards lower energy states because lower energy states are more stable. While classical annealing uses classical thermal fluctuations to guide a system to a low-energy state, quantum annealing may use quantum effects, such as quantum tunneling, as a source of delocalization to reach an energy minimum more accurately and/or more quickly than classical annealing.

In quantum annealing thermal effects and other noise may be present in annealing. The final low-energy state may not be the global energy minimum. Adiabatic quantum computation may be considered a special case of quantum annealing for which the system, ideally, begins and remains in its ground state throughout an adiabatic evolution. Thus, those of skill in the art will appreciate that quantum annealing systems and methods may generally be implemented on an adiabatic quantum computer. Throughout this specification and the appended claims, any reference to quantum annealing is intended to encompass adiabatic quantum computation unless the context requires otherwise.

A quantum processor may be designed to perform quantum annealing and/or adiabatic quantum computation. An evolution Hamiltonian can be constructed that is proportional to the sum of a first term proportional to a problem Hamiltonian and a second term proportional to a delocalization Hamiltonian, as follows:

$$H_E \propto A(t)H_P + B(t)H_D$$

where $H_E$ is the evolution Hamiltonian, $H_P$ is the problem Hamiltonian, $H_D$ is the delocalization Hamiltonian, and $A(t)$, $B(t)$ are coefficients that can control the rate of evolution, and typically lie in the range [0,1].

In some implementations, a time varying envelope function can be placed on the problem Hamiltonian. A suitable delocalization Hamiltonian is given by:

$$H_D \propto -\frac{1}{2}\sum_{i=1}^{N} \Delta_i \sigma_i^x$$

where represents the number of qubits, $\sigma_i^x$ is the Pauli x-matrix for the $i^{th}$ qubit and $\Delta_i$ is the single qubit tunnel splitting induced in the $i^{th}$ qubit. Here, the $\sigma_i^x$ terms are examples of "off-diagonal" terms.

A common problem Hamiltonian includes a first component proportional to diagonal single qubit terms and a second component proportional to diagonal multi-qubit terms, and may be of the following form:

$$H_P \propto -\frac{\varepsilon}{2}\left[\sum_{i=1}^{N} h_i \sigma_i^z + \sum_{j>i}^{N} J_{ij}\sigma_i^z \sigma_j^z\right]$$

where N represents the number of qubits, $\sigma_i^z$ is the Pauli z-matrix for the $i^{th}$ qubit, $h_i$ and $J_{ij}$ are dimensionless local fields for the qubits, and couplings between qubits, and ε is some characteristic energy scale for $H_P$.

Here, the $\sigma_i^z$ and $\sigma_i^z\sigma_j^z$ terms are examples of "diagonal" terms. The former is a single qubit term and the latter a two qubit term.

Throughout this specification, the terms "problem Hamiltonian" and "final Hamiltonian" are used interchangeably unless the context dictates otherwise. Certain states of the quantum processor are, energetically preferred, or simply preferred by the problem Hamiltonian. These include the ground states but may include excited states.

Hamiltonians such as $H_D$ and $H_P$ in the above two equations, respectively, may be physically realized in a variety of different ways. A particular example is realized by an implementation of superconducting qubits.

Further details on adiabatic quantum computing systems, methods, and apparatus are described in, for example, U.S. Pat. Nos. 7,135,701; and 7,418,283.

Hybrid Computing System Comprising a Quantum Processor

A hybrid computing system may include a digital computer communicatively coupled to an analog computer. In some implementations, the analog computer is a quantum computer and the digital computer is a classical computer.

The digital computer may include a digital processor that can be used to perform classical digital processing tasks described in the present systems and methods. The digital computer may include at least one system memory which can be used to store various sets of computer- or processor-readable instructions, application programs and/or data.

The quantum computer may include a quantum processor that includes programmable elements such as qubits, couplers, and other devices. The qubits can be read out via a readout system, and the results communicated to the digital computer. The qubits and the couplers can be controlled by a qubit control system and a coupler control system, respectively. In some implementations, the qubit and the coupler control systems can be used to implement quantum annealing on the analog computer.

KL Divergence

Kullback-Leibler (KL) divergence is a non-symmetric measure of the difference between two probability distributions. The KL divergence between a distribution P(x) and a Boltzmann distribution $Q(x)=e^{-\beta H(s)}/Z$ is:

$$KL[P \mid Q] = \int dx P(x)\log\left(\frac{P(x)}{Q(x)}\right)$$

The variable x can be a continuous variable or a discrete variable. The parameter $\beta \propto 1/T$ where T is the temperature of the system. The parameter β is also known as the inverse temperature. When the temperature of the system becomes zero, β goes to infinity. In the systems and methods described in the present application, β can be set to unity with no loss of generality.

The KL distribution is bounded for any pair of distributions P(x) and Q(x), and, for the case of a Boltzmann distribution $Q(x)=e^{-\beta H(x)}/Z$ can be decomposed into three parts as follows:

$$KL[P|Q]=\text{Energy}-\text{Entropy}+\log Z \geq 0$$

The energy term is:

$$\text{Energy} = \beta \sum_x P(x)H(x)$$

The entropy term is:

$$\text{Entropy} = -\sum_x P(x)\log(P(x))$$

The log partition function is log Z. The KL divergence has important implications for the ability of the distribution P(x) to represent the distribution Q(x). The combination of the energy and entropy terms provides an upper bound on the log partition function. The entropy on the full space, or a subspace, can be of interest, regardless of the distribution Q(x).

Throughout this document, efficient approximation of KL divergence refers to efficient approximation of the entropy and energy. It can be assumed, for the purposes of this document, either that log Z can be obtained independently, or that the KL divergence can be approximated to within an offset of log Z.

In practice, in some situations, the distribution P(x) is known only in terms of a set of samples Ω drawn independently from the distribution. A standard approach to approximating distribution P(x) from the samples is a maximum likelihood approach, which is referred to as the empirical distribution $P_{emp}(x)$, and which gives the following empirical representation of distribution:

$$P_{emp}(x) = \frac{1}{|\Omega|}\sum_{x_i \in \Omega} \delta_{x_i,x}$$

A marginal empirical distribution can be derived from P(x) by considering the frequencies on a subspace.

Shortcomings of Conventional Approaches

A shortcoming of conventional approaches is that, for high dimensional problems, the logarithm of the number of samples may be small compared to the entropy. In this case, the entropy cannot be estimated accurately using the empirical distribution $P_{emp}(x)$, and the KL divergence cannot be used to compare samplers.

More sophisticated estimators based on bin counts suffer from a similar limitation unless strong assumptions are made about the structure of the empirical distribution $P_{emp}(x)$. (See, for example, L. Paninski. Estimation of entropy and mutual information. Neural Comput., 15:1191-1253, 2003; P. Grassberger. Entropy Estimates from Insufficient Samplings. arXiv:physics/0307138v2, 2008).

For any Boltzmann distribution on a graphical model, a method can be defined which builds an efficient auxiliary sampler that is at least as good as the original sampler in terms of KL divergence. One embodiment, denominated as "fair postprocessing", is explained in more detail below. For certain types of graphical model and auxiliary samplers, a method can be defined which can, in the case of large entropy, more accurately determine the entropy and KL divergence with exponentially fewer samples than is required by conventional methods.

Scalable Comparison of High-Entropy Samplers

The systems and methods described in the present disclosure provide comparisons of post-processed samplers rather than raw sampler distributions in their empirical form. Some implementations use a partially analytic form. Using the systems and methods described in the present disclosure, KL divergence can be measured over a meaningful (e.g., generally large and sufficient) subspace. The present disclosure describes systems and methods for a scalable comparison of high-entropy samplers. In one approach, the empirical form is replaced by a tractable analytic form in the entropy term of the KL divergence.

A subproblem in estimation of KL divergence is estimation of entropy. The systems and methods described in the present disclosure can be applied, separately to KL divergence estimation, to measure entropy more accurately on the full space or on a subspace.

Moment Matching

The present disclosure describes moment-matching methods using a computational system comprising a quantum processor. The systems and methods described in the present disclosure can return samples from a probability distribution, and the samples can be used for machine learning. The samples can be used for generative and discriminative models in machine learning. The systems and methods described in the present disclosure can improve the quality of samples.

Summary of Claims

A method of operation of a computational system comprising at least one processor may be summarized as including receiving information defining a target distribution and a sampling process associated with a sampling distribution by the at least one processor; receiving a plurality of samples using the sampling process associated with the sampling distribution by the at least one processor; generating an empirical representation of the sampling distribution based on the plurality of samples by the at least one processor; generating a post-processed distribution from the plurality of samples by the at least one processor wherein generating a post-processed distribution includes: determining a first and a second subset of variables; and expressing a post-processed distribution in a mixture model comprising the sampling distribution and an analytic form for conditional resampling on the first and the second subset of variables; evaluating a Kullback-Leibler (KL) divergence of the target distribution on the post-processed distribution by the at least one processor; and comparing the sampling distribution to the target distribution based at least in part on the KL divergence by the at least one processor. Receiving a plurality of samples using the sampling process associated with the sampling distribution by the at least one processor may include receiving a plurality of samples from an analog processor. Receiving a plurality of samples from an analog processor may include receiving a plurality of samples from a quantum processor. Receiving information defining a target distribution may include receiving information defining a Boltzmann distribution.

The method may further include generating, by an analog processor, the plurality of samples using the sampling process associated with the sampling distribution, and wherein receiving a plurality of samples using the sampling process associated with the sampling distribution by the at least one processor includes receiving the plurality of samples by a digital processor from the analog processor.

A computing system comprising at least one processor for comparing a sampling distribution and a target distribution may be summarized as including receive information defining the target distribution and a sampling process associated with the sampling distribution by the at least one processor; receive a plurality of samples by the at least processor, wherein the plurality of samples are generated using the sampling process associated with the sampling distribution; generate an empirical representation of the sampling distribution based on the plurality of samples by the at least one processor; generate a post-processed distribution from the plurality of samples by the at least one processor wherein to generate the post-processed distribution the at least one processor: determines a first and a second subset of variables; expresses a post-processed distribution in a mixture model comprising the sampling distribution and an analytic form for conditional resampling on the first and the second subset of variables; evaluates a Kullback-Leibler (KL) divergence of the target distribution on the post-processed distribution; and compares the sampling distribution to the target distribution based at least in part on the KL divergence. The at least one processor may include a digital processor and an analog processor. The computing system may be operable to receive a plurality of samples by the digital processor, wherein the plurality of samples may be generated by the analog processor using the sampling process associated with the sampling distribution. The analog processor may be a quantum processor. The target distribution may be a Boltzmann distribution.

A hybrid computing system including at least one digital processor and an analog processor for comparing a sampling distribution and a target distribution may be summarized as including receive information defining the target distribution and a sampling process associated with the sampling distribution by the at least one digital processor; receive a plurality of samples by the at least one digital processor, wherein the plurality of samples are generated by the analog processor using the sampling process associated with the sampling distribution; generate an empirical representation of the sampling distribution based on the plurality of samples by the at least one digital processor; generate a post-processed distribution from the plurality of samples by the at least one digital processor wherein to generate the post-processed distribution the at least one digital processor: determines a first and a second subset of variables; expresses a post-processed distribution in a mixture model comprising the sampling distribution and an analytic form for conditional resampling on the first and the second subset of variables; evaluates a Kullback-Leibler (KL) divergence of the target distribution on the post-processed distribution by the at least one digital processor; and compares the sampling distribution to the target distribution based at least in part on the KL divergence by the at least one digital processor. The analog processor may be a quantum processor. The target distribution may be a Boltzmann distribution.

A method of operation of a computational system comprising at least one processor may be summarized as including receiving, by at least one digital processor, information defining a target distribution and a sampling process associated with a sampling distribution; receiving, by at least one digital processor, a plurality of samples, the plurality of samples generated by at least one analog processor; generating, by the at least one digital processor, an empirical representation of the sampling distribution based on the received plurality of samples; generating, by the at least one digital processor, a post-processed distribution from the received plurality of samples, by: determining a first and a second subset of variables; expressing a post-processed distribution in a mixture model comprising the sampling distribution and an analytic form for conditional resampling on the first and the second subset of variables; evaluating a Kullback-Leibler (KL) divergence of the target distribution on the post-processed distribution by the at least one digital processor; and comparing the sampling distribution to the target distribution based at least in part on the KL divergence.

The method may further include generating, by the at least one analog processor, a plurality of samples using the sampling process associated with the sampling distribution. Generating a plurality of samples using the sampling process associated with the sampling distribution may include generating the plurality of samples with a quantum processor; Receiving information defining a target distribution may include receiving information that defines a Boltzmann distribution.

A method for generative machine learning by a computational system comprising a quantum processor and a digital processor may be summarized as including: for a first iteration of a first iterative loop: determining, by the quantum processor, a first set of spin configurations for which the scalar product of a first weighting vector and a feature vector attains a largest value; and updating the first weighting vector, by the digital processor, to form an updated weighting vector based at least in part on a difference between the feature vector evaluated at the first set of spin configurations and a vector of feature moments; and for a subsequent iteration of the first iterative loop: determining, by the quantum processor, a subsequent set of spin configurations for which the scalar product of a subsequent weighting vector and the feature vector attains a largest value; and updating the subsequent weighting vector, by the digital processor, based at least in part on a difference between the feature vector evaluated at the subsequent set of spin configurations and the vector of feature moments.

The method may further include: for the first iteration of the first iterative loop, performing a first iteration of a second iterative loop, the second iterative loop nested in the first iterative loop, the second iterative loop over a plurality of sets of observed visible variables, the first iteration of the second iterative loop comprising: determining, by the quantum processor, a first set of hidden variables for which the scalar product of the first weighting vector and the feature vector for a first set of the plurality of sets of observed visible variables attains a largest value; for the subsequent iteration of the first iterative loop, performing a second iteration of the second iterative loop: determining, by the quantum processor, values of a second set of hidden variables for which the scalar product of the subsequent weighting vector and the feature vector for a second set of the plurality of sets of observed visible variables attains a largest value.

The method may further include, before performing the first iteration, initializing, by the digital processor, the weighting vector. Initializing the first weighting vector may include assigning the same value to each component of the first weighting vector.

In one implementation, updating the weighting vector based at least in part on a difference between the feature vector evaluated at the first set of spin configurations and a vector of feature moments may include updating the weighting vector by forming the sum of a previous weighting vector and a difference between the vector of feature moments over a target distribution on a set of spin configurations and the feature vector evaluated at the first set of spin configurations.

The method may further include defining a graph comprising a plurality of vertices V and a plurality of edges E; and before performing the first iteration, defining the feature vector, the feature vector comprising one or more components, each component comprising a feature function that maps a set of spin configurations s into real numbers, each spin configuration associated with a respective vertex of the graph. The method may include before performing the first iteration, receiving, by the digital processor, the vector of feature moments over a target distribution on the set of spin configurations.

In some implementations, the set of spin configurations s is a random variable on $\{-1,1\}^n$ and the feature function is of the form $\alpha_i s_i$ for $i \in V$ or $a\alpha_{i,j} s_i s_j$ for $\{i, j\} \in E$, and $\alpha_i, \alpha_{i,j}$ are real numbers.

The method may include, following the subsequent iteration, outputting at least one set of the first set of spin configurations or the subsequent set of spin configurations by the digital processor.

A method for discriminative machine learning by a computational system comprising a quantum processor and a digital processor may be summarized as including: for a first iteration of a first iterative loop: performing a first iteration of a second iterative loop, the second iterative loop nested in the first iterative loop, the second iterative loop over a plurality of sets of observed visible variables, the first iteration of the second iterative loop comprising: determining, by the quantum processor, a first set of labels for which the scalar product of a first weighting vector and the feature vector for a first set of the plurality of sets of observed visible variables attains a largest value; updating the first weighting vector, by the digital processor, to form an updated weighting vector based at least in part on an average discrepancy between the feature vector and a vector of feature moments, the average discrepancy determined over the plurality of sets of observed visible variables; for a subsequent iteration of the first iterative loop: performing a second iteration of the second iterative loop comprising: determining, by the quantum processor, a second set of labels for which the scalar product of a subsequent weighting vector and the feature vector for a second set of the plurality of sets of observed visible variables attains a largest value; updating the subsequent weighting vector, by the digital processor, to form an updated weighting vector based at least in part on an average discrepancy between the feature vector and a vector of feature moments, the average discrepancy determined over the plurality of sets of observed visible variables; and outputting at least one of the weighting vectors.

The method may further include receiving an input vector, and determining the most likely label for the input vector. Determining the most likely label for the input vector may include performing a plurality of iterations of a third iterative loop over each of the output weighting vectors, each iteration comprising determining, by the quantum processor, a label for which the scalar product of the respective weighting vector and the feature vector attains a largest value.

The method may further include, for the first iteration of the first iterative loop, and the first iteration of the second iterative loop: determining, by the quantum processor, a first set of hidden variables for which the scalar product of the first weighting vector and the feature vector for a first set of the plurality of sets of observed visible variables attains a largest value; and for the subsequent iteration of the first iterative loop, and the second iteration of the second iterative loop: determining, by the quantum processor, a second set of hidden variables for which the scalar product of the subsequent weighting vector and the feature vector for a second set of the plurality of sets of observed visible variables attains a largest value.

A computational system may be summarized as including at least one processor and at least one nontransitory processor-readable storage medium that stores at least one of processor-executable instructions or data which, when executed by the at least one processor, cause the at least processor to execute any of the methods described above.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been selected for ease of recognition in the drawings.

FIGS. 1A, 1B, and 1C are flow-diagrams illustrating a method for characterizing a sampling process.

DETAILED DESCRIPTION

Figure 1A:
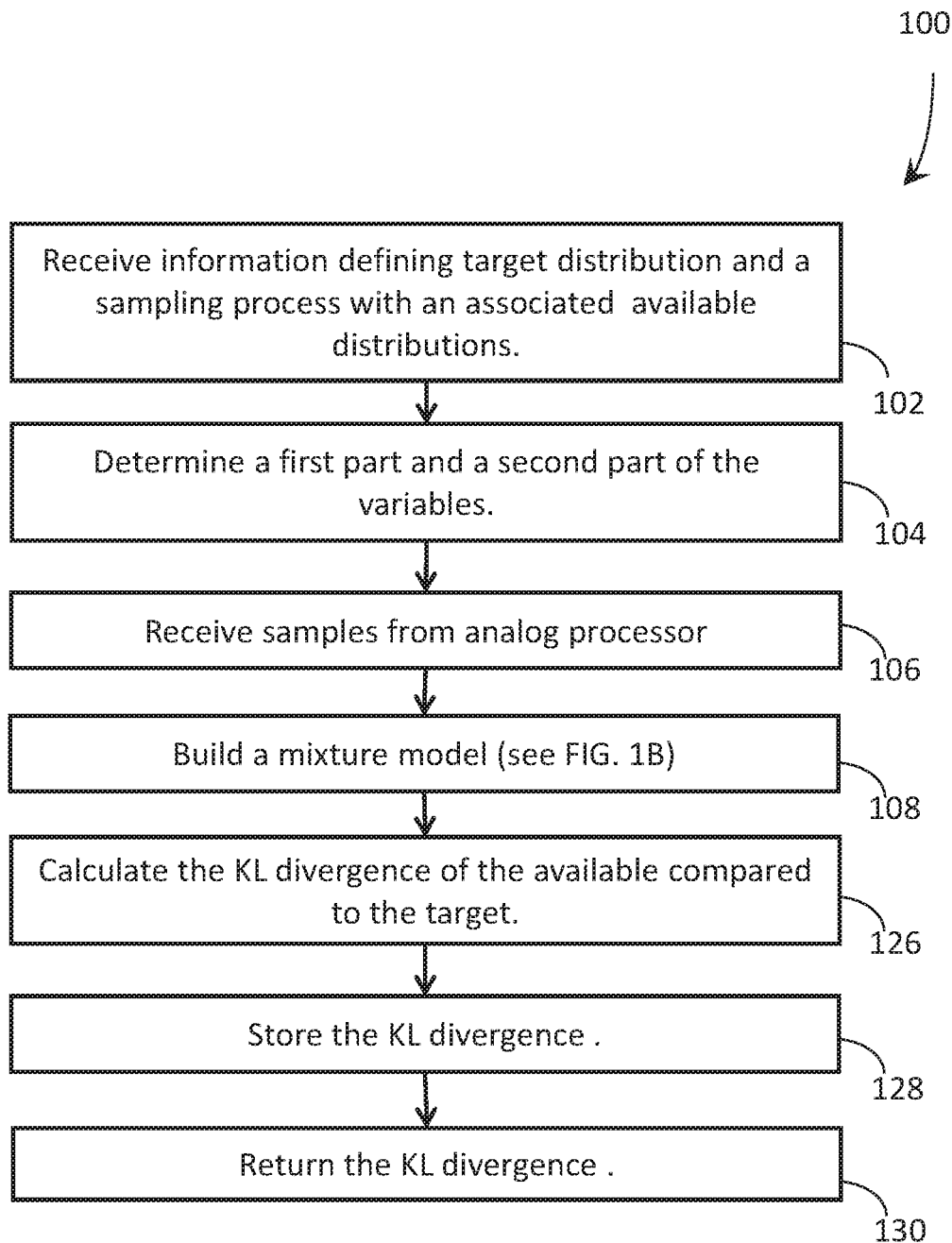

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with quantum processors, such as quantum devices, couplers, and control systems including microprocessors and drive circuitry have not been shown or described in detail to avoid unnecessarily obscuring descriptions of the embodiments of the present methods. Throughout this specification and the appended claims, the words "element" and "elements" are used to encompass, but are not limited to, all such structures, systems, and devices associated with quantum processors, as well as their related programmable parameters.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" "an embodiment", "another embodiment", "one example", "an example", "another example", "one implementation", "another implementation", or the like means that a particular referent feature, structure, or characteristic described in connection with the embodiment, example, or implementation is included in at least one embodiment, example, or implementation. Thus, the appearances of the phrases "in one embodiment", "in an embodiment", "another embodiment" or the like in various places throughout this specification are not necessarily all referring to the same embodiment, example, or implementation. Furthermore, the particular features, structures, or characteristics may be combined in any suitable manner in one or more embodiments, examples, or implementations.

It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors. It should also be noted that the term "or" is generally employed in its sense including "and/or" unless the content clearly dictates otherwise.

The headings provided herein are for convenience only and do not interpret the scope or meaning of the embodiments.

Use of Post-Processed Samplers to Determine Entropy and KL Divergence

For any Boltzmann distribution on a graphical model, there exist methods for building auxiliary samplers efficiently—samplers that are at least as good as the original in terms of KL divergence. The presently disclosed systems and methods can, in the case of large entropy, determine more accurately the entropy and KL divergence with exponentially fewer samples than required by existing systems and methods.

The present disclosure describes systems and methods for using post-processed samplers to provide improved estimates of entropy and KL divergence, and/or to provide bounds on entropy and KL divergence.

It can be beneficial to use an improved sampler that can be derived efficiently from an original sampler. In this context, efficiency can mean scaling as O(N) or O(N log N) where N is the number of variables.

In some instances, the post-processed distribution has a KL divergence and entropy that are close to those of the original distribution, in which case measurement of the post-processed distribution can provide approximations to (or bounds upon) the KL divergence and entropy of the original distribution. In other instances, the KL divergence and entropy of the post-processed distribution may be of interest for other reasons.

An improved estimator of entropy can be determined on the full space, or a subset of variables, when a subset of low tree-width (or a subset otherwise suitable for exact inference) can be identified. The probability of variables in the subset conditioned on the variables outside the subset can be evaluated exactly and efficiently.

An improved estimator for KL divergence is possible when two subsets of the variables can be identified, such that the induced subgraphs are low tree-width or otherwise suitable for exact inference. The two subsets ideally span all variables, and need not be disjoint. For the estimator to demonstrate scalable improvements in estimation, it is advantageous for the size of the subsets to be O(N). Bipartite graphical models, and sparse graphical models, are examples of models that meet the criteria above.

Thus, the techniques described herein can enhance the operation of various computing devices, significantly improving computational time or resources required to solve a given problem. Thus, the techniques provide a technical solution to a technical problem, producing a technical effect in the operation of computing devices.

Fair Post-Processing

A post-processing procedure is deemed to be "fair" if it is efficient (for example, if the processing time varies as O(N) or O(N log(N)) for N variables), and if it decreases (in expectation) the KL divergence for a sampler. If, and only if, the sampler is "perfect" (i.e., has a distribution equal to the target distribution Q(x)), will fair post-processing then leave the expected KL divergence unchanged.

An example of a fair post-processing procedure is conditional resampling of a subset $x_L$ given its complement $x_R$. Sampling from conditional distributions can sometimes be exact and efficient even where sampling the full distribution is not. Gibbs sampling is a Markov Chain Monte Carlo method for obtaining a sequence of operations which are approximate from a specified multivariate probability distribution, when direct sampling of the distribution is difficult. Using this procedure, the system can draw samples from the distribution P(x), calculate the marginal distribution $P(x_R)$, and then sample the left values according to the conditional distribution $Q(x_L|x_R)$. The samples produced are representative of a left post-processed distribution as follows:

$$P_{ppL}(x) = Q(x_L|x_R)P(x_R)$$

The KL divergence can be decomposed into a marginal part and a conditional part as follows:

$$KL[P(x) | Q(X)] = \\ KL[P(x_R) | Q(x_R)] + \sum_{x_R} P(x_R) \sum_{x_L} P(x_L | x_R) \log\left(\frac{P(x_L | x_R)}{Q(x_L | x_R)}\right)$$

The second term on the right hand side of the above equation is a weighted sum of KL divergences, and is generally positive, unless the sampler distribution $P(x_L|x_R)$ is the same as the target distribution $Q(x_L|x_R)$ in which case the term is zero.

The KL divergence of the post-processed distribution can provide useful information about the unprocessed samples. For example, the KL divergence of the left post-processed sampler can provide a lower bound on the KL divergence of the unprocessed sampler. If the conditional distribution is close to a Boltzmann distribution, the bound can be correspondingly tight. The unprocessed sampler can have a KL divergence that is greater than or equal to the left post-processed sampler when the second term on the right hand side of the above equation is zero for the left post-processed sampler distribution, and the first term is the same as the unprocessed sampler.

$$KL[P(x)|Q(x)] \geq KL[P_{ppL}(x)|Q(x)] = KL[P(x_R)|Q(x_R)]$$

Post-processing in this case does not degrade the original distribution as measured by KL divergence.

KL Divergence

KL divergence can be measured more accurately by evaluating the distribution brought about by either one step of conditional resampling or two steps of conditional resampling. The KL divergence of the left post-processed sampler can be expressed as follows:

$$KL[P_{ppL}(x) | Q(x)] = \sum_{x_R} P_{ppL}(x_R) \log\left(\frac{P_{ppL}(x_R)}{Q(x_R)}\right)$$

Since the marginal distribution on the right subset for the left post-processed sampler is the same as for the original sampler, an empirical estimate can be substituted. For the unprocessed sampler, the empirical estimate can be over N variables, whereas for the post-processed sampler the empirical estimate can be over fewer variables (for example in the case of a balanced bipartite graph, over N/2 variables). As N grows, exponentially fewer samples can be used to obtain an estimate, because the entropy on the subspace is smaller by O(N) than the entropy on the full space.

Even so, for large enough values of N, the method can reach a bound of O(log n) in the entropy that can be measured. To reduce further the number of samples required for accurate estimation, a second conditional resampling step can be used, in which a set $x_{L'}$ is conditionally resampled subject to its complement $x_{R'}$. This particular notation is used since, in the case of a connected bipartite graph, the choices $x_R = x_{R'}$ and $x_L = x_{L'}$ can be optimal, though more generally these identities are not necessary.

Considering first resampling $x_{R'}$ given $x_L$, and then $x_L$ given $x_R$, the marginal distribution on $x_R$ is described by as follows:

$$P_{pp}(x_R) = \sum_{x_L} P(x_{L'}) Q(x_{R'} | x_{L'})$$

The KL divergence of the distribution for this post-processed sampler can be:

$$KL[P_{pp}(x) | Q(x)] = \sum_{x_R} P_{pp}(x_R) \log\left(\frac{P_{pp}(x_R)}{Q(x_R)}\right)$$

The sampler specific contribution can be achieved by replacing $P(x_{L'})$ by the empirical estimate to the post-processed distribution $P_{emp}(x_{L'})$. The marginal distribution with this substitution can be denoted by $P_{pp,emp}(x_R)$. Evaluating this KL divergence can be inefficient by exact summation, even with the introduction of the empirical approximation to $P_{pp}(x_R)$. However, it can be evaluated by Monte-Carlo as follows:

$$KL[P_{pp}(x) | Q(x)] = E\left[\log \frac{P_{pp,emp}(x_R)}{Q(x_R)}\right]$$

where E[•] indicates an expectation with respect to samples drawn from the distribution $P_{pp,emp}(x_R)$.

For some models, the inefficiency only affects the entropy term, and, in this case, an alternative evaluation can be as follows:

$$KL[P_{pp}(x) | Q(x)] = E[\log P_{pp,emp}(x_R)] - \sum_{x_R} P_{pp,emp}(x_R) \log[Q(x_R)]$$

The KL divergence evaluated this way can be efficiently estimated up to the offset log Z.

A conventional approach to KL divergence estimation from a sampled distribution can include making an empirical estimate as follows:

$$KL[P(x) | Q(x)] = \sum P_{emp}(x_R) \log\left(\frac{P_{emp}(x_R)}{Q(x_R)}\right)$$

The estimate of the entropy term can be expressed as follows:

$$S[P(x)] = -\sum_x P_{emp}(x) \log(P_{emp}(x))$$

Entropy on a subset can also be measured from the empirical distribution on the subspace $x_R$ as follows:

$$S[P(x_R)] = -\sum_{x_R} P_{emp}(x_R) \log(P_{emp}(x_R))$$

Entropy estimates can be bounded by O(log(n)), and can also place a bound on the quality of the estimate of KL divergence. The same scaling can hold when the empirical distribution approach is replaced by other, possibly more sophisticated, estimators (see, for example, L. Paninski. Estimation of entropy and mutual information. Neural Comput., 15:1191-1253, 2003; P. Grassberger. Entropy Estimates from Insufficient Samplings. arXiv:physics/0307138v2, 2008)

The KL divergence can be approximated by the KL divergence of a post-processed distribution according to the presently disclosed systems and methods. The approximation can provide a lower bound on the KL divergence and can be evaluated efficiently (for example, with exponentially fewer samples). The bound can become increasingly good as the post-processed distribution approaches the target distribution.

A corrected form of the KL divergence (with the log Z term subtracted) can be defined as follows:

$$KLu[P_{pp}(x)|Q(x)] = KL[P_{pp}(x)|(Q(x)] - \log Z$$

The entropy of the full distribution can be determined from the KL divergence as follows:

$$S[P_{pp}(x)] = -KLu[P_{pp}(x) | Q(x)] + \beta \frac{\partial}{\partial \beta} KLu[P_{pp}(x) | Q(x)]$$

where the derivative term in the above equation is an approximation of the energy term in the KL divergence, and can be efficiently evaluated either by direct summation or by Monte-Carlo methods. The entropy is O(N) and is not bounded by O(log(n)).

Estimation of entropy on a subset $x_R$ can also be improved by the presently described systems and methods:

$$S[P_{pp}(x_R)] = E[\log P_{pp,emp}(x_R)]$$

Restrictions on the subset $x_R$ used in the evaluation of the KL divergence up to an offset log Z generally do not apply to entropy estimation.

In some implementations, approximations to (or bounds on) the full entropy or KL divergence can be based on approximations to entropy on a subset (for example, by using a Bethe or Kikuchi/CVM type of approximation or a mean field type expansion to obtain a bound). In some implementations, the method can be applied to these marginal distributions.

In some implementations, E [log f (x)] can be expressed as follows:

$$E[\log f(x)] = E[\log(f(x)R(x))] - E[\log R(x)]$$

where R(x) can be chosen so as to permit an exact evaluation of the second term on the right hand side of the above equation, and also so as to reduce the variance of the first term on the right hand side of the equation. A benefit of this approach can be a more efficient evaluation.

Figure 1B:
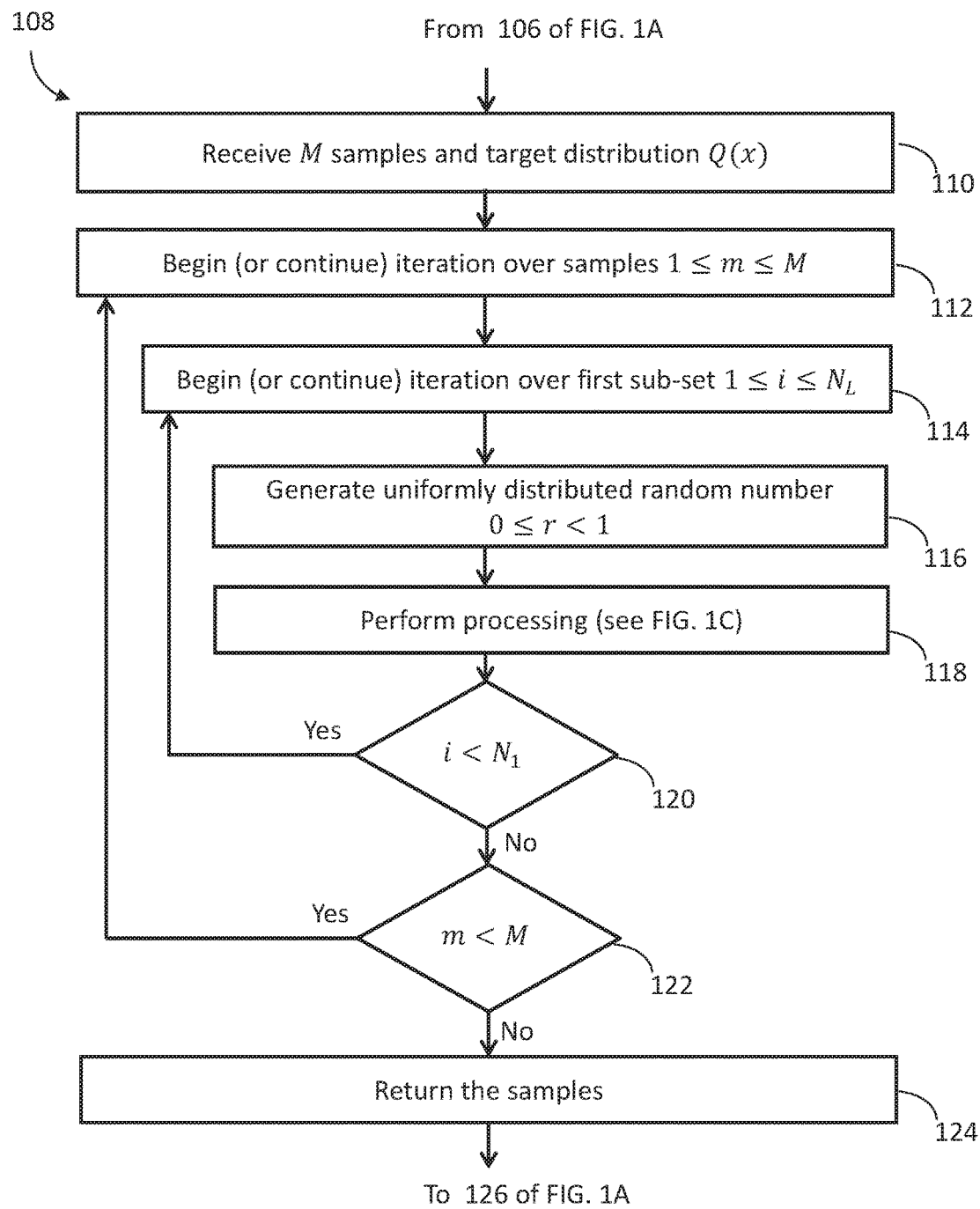
Figure 1C:
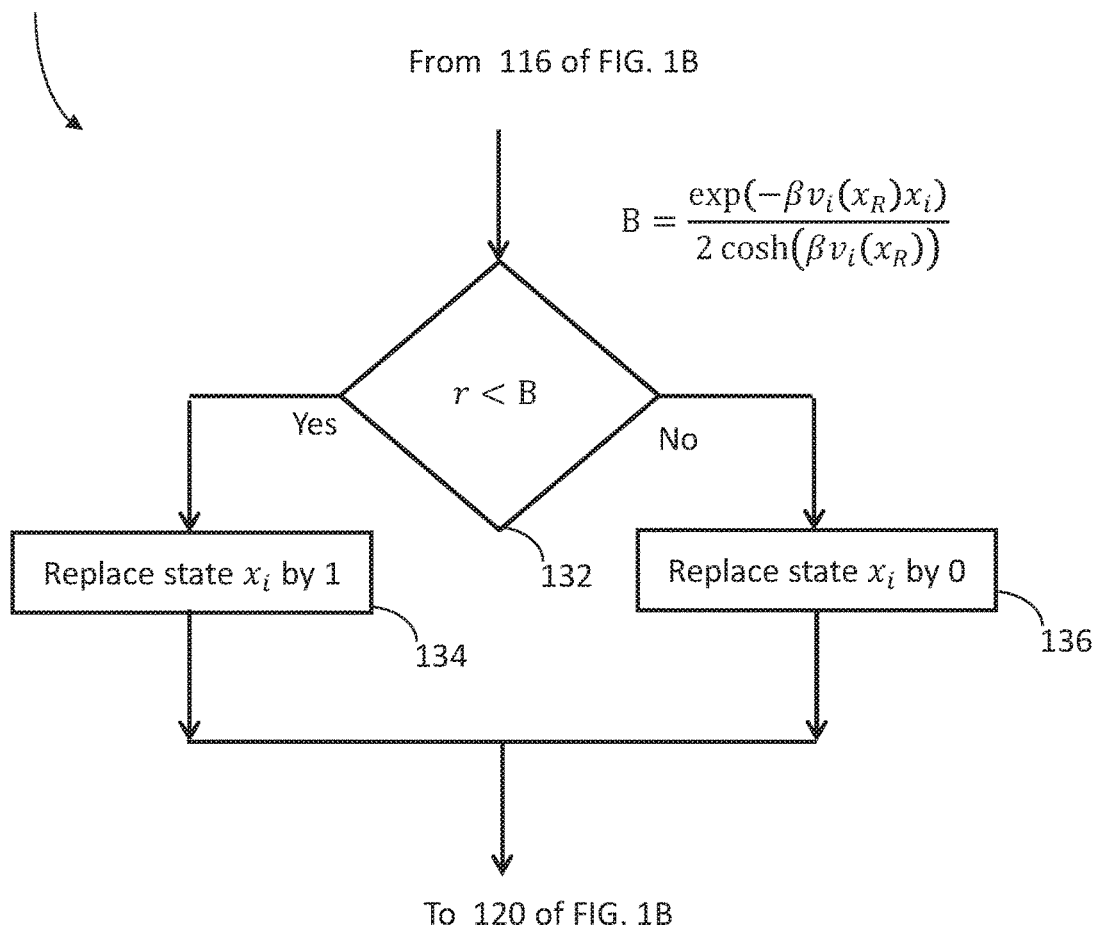

FIGS. 1A, 1B, and 1C are flow-diagrams illustrating a method 100 for characterizing a sampling process. In some examples, one or more of these acts are performed by one or more circuits and/or processors (i.e., hardware). In some examples, a sampling device including a hybrid computer (such as hybrid computer 800 of FIG. 8) performs the acts in method 100.

Method 100 may be included in a process performed by a hybrid computer to judge, in a fair manner, the distribution from one sampling process against at least one other competing sampling process. The hybrid computer can provide a fair comparison between two sampling processes.

In some examples, the sampling processes are effectively at zero temperature, as occurs, for example, in applications involving the fair (efficient) sampling of ground states. In other examples, the sampling processes are at a finite, non-zero temperature, as occurs, for example, in machine learning applications.

In some examples, the first process is a sampling without post-processing. In some examples, the second process is a sampling with post-processing. In some examples, the first process and the second process differ by a post-processing technique. In other examples, these processes differ by another aspect of the sampling process.

Each sampling process relates to an available probability distribution. When two sampling processes are compared, they share (or are assumed to share) the same target distribution. In some examples, the target distribution is an analytic distribution such as a Boltzmann distribution.

Method 100 generates a first measure for a first sampling process, and a second measure for a second process, and compares the first measure to the second measure, as described below.

At 102, the sampling device receives information defining both a target distribution and a sampling process involving an available distribution. The sampling process involving an available distribution can include a set of samples drawn from an analog processor. In some examples, the set of samples has been post-processed.

At 104, the sampling device determines a first part and a second part of a plurality of variables for the set of samples. Each sample in the set of samples is a state defined by a respective set of binary values for the plurality of variables.

In one implementation, the sampling device includes an analog processor (such as quantum processor x of FIG. x). In one example of a sampling device including an analog processor, the analog processor has a target probability distribution Q(x) described by a Boltzmann distribution. The problem Hamiltonian is H(x), and the variables are the vector x.

Consider a sampling task where the goal is to sample from the following distribution:

$$Q(x) \propto e^{-\beta H(x)}$$

As described above, the target probability distribution Q(x) may not be accessible, and so an available probability distribution P(x) can be used.

The sampling device can form a partition of the variables x into a first part and a second part, also referred to as a first subset and a second subset, respectively. The sampling device can form (or receive information defining) the first subset $x_1$ and a second subset $x_2$, such that $x = x_1 \cup x_2$. The subset $x_1$ can be defined as having a cardinality $N_1$ and the second subset $x_2$ can be defined as having a cardinality $N_2$, where $N_1 + N_2 = N$, the number of variables.

In some examples, the sampling device selects the partition such that the conditional probability distribution $Q(x_1|x_2)$ has an exact form. In some examples, the sampling device selects the partition such that $Q(x_1|x_2)$ can be efficiently marginalized. In some examples, the sampling device selects the partition such that the conditional probability distribution $Q(x_2|x_1)$ has an exact form, or can be efficiently marginalized.

The sampling device in forming the partition can make use of information describing a conditional probability distribution for an objective function having exact or efficiently computable form. The selection of the partition can be more straightforward if the graph corresponding to the problem Hamiltonian admits low tree width models. The selection of the partition can be more straightforward if the induced sub-graphs caused by the partition have low tree width.

Selection of the partition can be straightforward where the problem Hamiltonian is bipartite (i.e., where the Hamiltonian can be modelled as a bipartite graph). A bipartite graph can be defined as a graph whose vertices may be divided into two disjoint subsets, and where the edges of the bipartite graph are between subsets, rather than within subsets. Examples of bipartite graphs include hardware graphs implemented using superconducting quantum processors. See, for example, Katzgraber, et al. 2014 "Glassy Chimeras Could Be Blind to Quantum Speedup: Designing Better Benchmarks for Quantum Annealing Machines" *Physical Review* X 4, 021008.

While bipartite graphical models (such as the Chimera graph described in the above reference by Katzgraber, et al.) provide a suitable illustrated application for method 100, the method is not limited to bipartite graphical models. In the case of a bipartite graph, both conditional probability distributions $Q(x_1|x_2)$ and $Q(x_2|x_1)$ can be problems having zero tree-width. If Q(x) is a Boltzmann distribution, interactions in the problem Hamiltonian are pairwise, and the exact form of $Q(x_1|x_2)$ and $Q(x_2|x_1)$ can be derived as follows.

For convenience, variables in the first subset are labeled from 1 to $N_1$, and variables in the second (complementary) subset are labeled from $N_1+1$ to N. With this notation, the target distribution $Q(x)$ can be written as follows:

$$Q(x) = \frac{1}{Z}\exp\left(-\beta\sum_{i=1}^{N_1}\sum_{j=N_1+1}^{N}J_{ij}x_ix_j - \beta\sum_{i=1}^{N}h_ix_i\right)$$

It is convenient to define an effective field for each variable in the first subset and the second subset. The effective field can be the combination of the local bias term for a qubit and the effect of the couplings from the neighboring qubits, expressed as follows:

$v_j(x_1) = h_j + \Sigma_{i=1}^{N_1}J_{ij}x_i\beta$ $v_i(x_2) = h_i + \Sigma_{j=N_1+1}^{N}J_{ij}x_j$ The target distribution $Q(x)$ can be expressed in terms of these effective fields, and can be marginalized efficiently. The target distribution $Q(x)$, conditioned on the first subset given the second subset is of treewidth zero. The distribution is factorizable, as follows:

$$Q(x_i \mid x_2) = \frac{\exp(-\beta v_i(x_2)x_i)}{2\cosh(\beta v_i(x_2))}$$

$$Q(x_1 \mid x_2) = \prod_{i=1}^{N_1} Q(x_i \mid x_2)$$

The target distribution $Q(x)$, conditioned on the second subset given the first subset, is also of treewidth zero.

At 106, the sampling device receives a plurality of samples drawn from the analog processor. In one implementation, the analog processor provides the samples in response to a request from the sampling device. In another implementation, the plurality of samples was previously drawn from the analog processor. The number of samples drawn from the analog processor in method 100 is denoted by M, and each sample is indexed by m.

At 108, the sampling device builds a mixture model comprising two parts. A first part is a conditional target distribution for the first subset given the second subset, $Q(x_1|x_2)$. A second part is the available empirical distribution for the second subset.

In one implementation, the available empirical distribution for the second subset is the exact distribution. In another implementation, the available empirical distribution for the second subset is an empirical distribution. In practice, the method may not have access to the exact form of the available distribution. For example, as described above, the method may only know the available distribution in terms of a plurality of samples, $\Omega$, drawn independently from the available distribution.

A standard approach to approximate the distribution from which the samples were drawn is a maximum likelihood method, which, as described above, gives an empirical representation:

$$P_{emp}(x) = \frac{1}{|\Omega|}\sum_{x_j\in\Omega}\delta_{x_j,x}$$

This is an empirical available distribution. In some examples, the mixture model is expressed as:

$P_{ppL,emp}(x) = Q(x_1|x_2)P_{emp}(x_2)$

In some examples, the mixture model includes the product of the conditional target distribution for the first subset given the second subset and the empirical available distribution.

FIG. 1B is a flow-diagram illustrating one implementation of act 108 of method 100 of FIG. 1A.

At 110, method 100 receives M samples and a target distribution $Q(x)$. Acts 112 to 122 describe an iteration of the M samples. Acts 114 to 120 describe an iteration over the first subset. At 124, method 100 returns the samples, and control proceeds to 126 of FIG. 1A.

Referring again to FIG. 1A, at 126, the sampling device determines the KL divergence of the available distribution compared to the target distribution.

At 128, the sampling device stores the KL divergence.

At 130, the sampling device returns the KL divergence.

FIG. 1C is a flow-diagram illustrating one implementation of act 118 of method 100 of FIG. 1B. At 132, method 100 determines whether random number r is less than B, where B is the conditional probability of $x_i$ given $x_R$, $Q(x_i|x_R)$, in a Boltzmann distribution. If yes, then method 100 proceeds to 134 where the state $x_i$ is replaced by 1. If not, then method 100 proceeds to 136 where the state $x_i$ is replaced by 0. Method 100 returns to 120 of FIG. 1B.

Bipartite Graphical Models

Though the presently disclosed systems and methods can be applied to bipartite and non-bipartite graphical models, the bipartite graphical models are typically the simpler cases. For bipartite cases, the following identities can be chosen $x_R = x_R$, and $x_L = x_L$, and the sets can be chosen so that both $Q(x_L|x_R)$ and $Q(x_R|x_L)$ are tree-width zero problems. The conditional problem on the left subset $x_L$ given the right subset $x_R$ is of tree width zero, and vice versa. The conditional distribution in each case is factorizable.

For a bipartite graph, the post-processing procedure can be chosen as a half-sweep of block Gibbs sampling to provide samples $Q(x_L|x_R)$. See, for example, the method described below which is a half sweep block Gibbs sampling for a bipartite graph:

---
for x ∈ unique samples do
    for i = 1, ... $N_L$ do
        r = uniform random number on [0,1];
        Replace existing state with a probabilitistically determined value as follows:

$x_i \leftarrow 1$ if $r < \dfrac{\exp(-\beta v_i(x_R))}{2\cosh(\beta v_i(x_R))}$ and $x_i \leftarrow -1$ otherwise;

end for;
end for

---

Entropy can be measured in the left processed sampler over the set $x_L$ as follows:

$$S[P_{ppL}(x_L)] = \sum_{x_R'} Q(x_L \mid x_R')P_{emp}(x_R')\log\left(\sum_{x_R} Q(x_L \mid x_R)P_{emp}(x_R)\right)$$

The distribution on the subspace can be a sum of factorized distributions with one distribution per non-zero term in $P_{emp}(x_R)$. Limitations associated with entropy measurement by such a model have been described in, for example, Jaakkola et al., Improving the Mean Field Approximation via the Use of Mixture Distributions, Learning in Graphical Models, Springer, 1998.

In this case, the entropy is no longer bounded by log n. It can be as large as (N/2) log 2 for a balanced model, and can be used to study exponential trends in the entropy. For any finite temperature, or connected zero temperature solution space, an entropy O(N) can be measured.

A Monte Carlo method can be used to compute the expression:

$$\sum_{x_L} P_{ppL}(x_L) \log P_{ppL}(x_L) = E\left[\sum_{x_R} Q(x_L \mid x_R) P_{emp}(x_R)\right]$$

The expression can be evaluated with respect to m samples drawn from the empirical left post-processed distribution. See, for example, the method below which describes sampling from a mixture model expressed as follows:

$$P_{ppL,emp}(x_L) = \sum_{x_R} Q(x_L \mid x_R) P_{emp}(x_R)]$$

The method is as follows:

---

Inputs: Target model $\{\beta, J, h\}$, samples on right subspace $\Omega = \{x_R\}$
Outputs: A set of m Monte Carlo samples $\Omega' = \{x_L\}$ on left subspace
while number of samples < m do
   select $x_R$ from $\Omega$
   for i = 1, ... $N_L$ do
     r = uniform random number on [0,1];
     Replace existing state with a probabilitistically determined value as follows:

$$x_i \leftarrow 1 \text{ if } r < \frac{\exp(-\beta v_i(x_R))}{2\cosh(\beta v_i(x_R))} \text{ and } x_i \leftarrow -1 \text{ otherwise;}$$

end for
   add sampled state to $\Omega'$
end while

---

The samples x can be selected uniformly at random from the set $\Omega$ of n samples. Alternatively, the method can go sequentially through the components of the distribution. Oversampling can be used to reduce statistical errors.

With Monte Carlo sampling, errors are typically of the order $\sigma/m$ where m is the number of samples, and $\sigma^2$ is the variance of log $P_{ppL}(x_L)$. The complexity of the method is O(Nmn) where N is the number of variables, n=|$\Omega$| is the number of samples characterizing the sampler of interest, and m is the number of Monte Carlo samples generated.

Although the entropy estimate for the left-post processed sampler need not be bounded by log n, its accuracy can depend on how similar the distribution $P_{ppL,emp}(x_R)$ is to the distribution $P_{ppL}(x_R)$. The fidelity is generally likely to be better at high temperature, or for models with well defined (and not too numerous) modes.

The post-processing method described above can provide a way to consider the trade-off between the number of samples and the complexity of the solution space. Roughly speaking, at finite or zero temperature, we need n to be comparable to the number of valleys (modes/clusters) that define the solution spaces, where the definition of cluster is a function of the type of post-processing used. If two states are mutually reachable by one step of the post-processing with reasonable probability (i.e., if the path does not involve crossing a large energy barrier), then they are typically in the same valley.

This method of entropy estimation applied to the marginal left-processed distribution $P_{ppL}(x_L)$, can similarly be applied to the marginal post-processed distribution $P_{pp}(x_R)$, in order to estimate the entropy on the right subset which is one component in the evaluation of the KL divergence. The post-processed distribution $P_{pp}(x)$ can be built by a full sweep of Gibbs sampling—first conditionally sampling the right subset given the left, and then the left given the right.

$Q(x_R)$ can also be used to evaluate the KL divergence of the post-processed sampler. In the bipartite case, $Q(x_R)$ can be written in analytic form, as follows:

$$Q(x_R) = \sum_{x_L} Q(x) = \frac{1}{Z(\beta)} \exp\left(-\beta \sum_{j=N_L+1}^{N} h_j x_j\right) \prod_i \{2\cosh(\beta v_i(x_R))\}$$

Sampling

Sampling is a process for selecting data points from a probability distribution. Sampling can be a computationally difficult task, in particular for high-dimensional multi-modal probability distributions. Some useful approaches to sampling high-dimensional multi-modal probability distributions include variations of Metropolis-Hastings sampling in which a Markov chain is constructed whose equilibrium distribution is the desired target sampling distribution.

For Metropolis-Hastings samplers, and related samplers, the first samples are often not suitable for use. The initial samples, if within some distance of the start of the chain that is comparable to the autocorrelation length of the chain, can be correlated with the initial chain value. The initial chain value may not even be random, the initial sample may not be random samples from within a distribution of interest. So, a sampling device building a chain needs to equilibrate the chain (or burn-in the chain) before serving up useful samples from the chain. In some examples, the burn-in length is several times the autocorrelation length.

Figure 8:
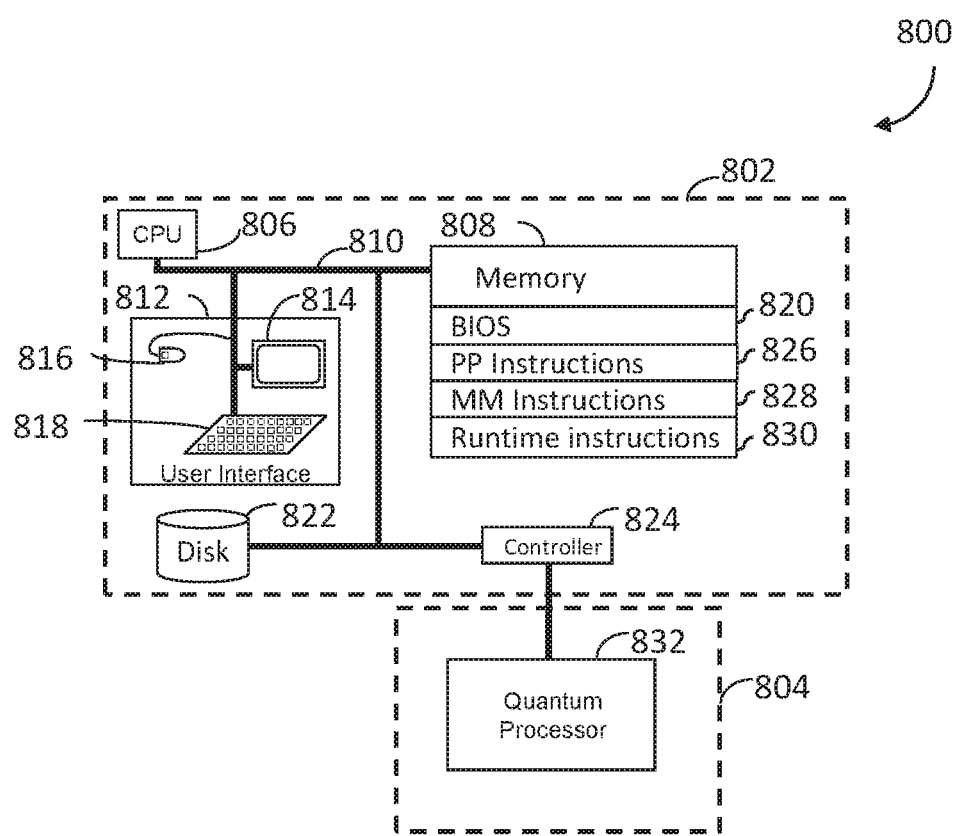
FIG. 8 is a block diagram of a hybrid computing system in accordance with the present systems, devices, articles, and methods, according to at least one implementation.

In some examples, a sampling device including an analog processor, such as shown in FIG. 8, exploits the inherent randomness in a physical system, and in the associated act of measurement, as a source of randomness. Such a system provides samples from even highly multi-modal distributions. In some examples, the sampling rate is faster than possible from a digital computer. In some examples, thermal effects contribute to randomness. In some examples, quantum effects contribute to randomness. In some examples, both quantum effects and thermal effects contribute to randomness.

Temperature can offer a source of randomness. In ideal non-quantum physical systems, samples are typically governed by a statistical distribution such as the Boltzmann distribution where the probability varies as an inverse exponential of the energy, so that high-energy states have low probability, and low-energy states have high probability. In some examples, a sampling device at high temperature produces random samples. In non-quantum non-ideal physical systems, samples can be governed by a different statistical distribution. This is an example of an available statistical distribution. In some physical systems, thermal effects compete with quantum effects.

As previously described, quantum effects can offer a source of randomness. In ideal quantum physical systems, samples are governed by quantum mechanics. The samples can be affected by the presence of off-diagonal terms in the Hamiltonian, and by the act of measuring the system. When the off-diagonal terms in the Hamiltonian are sufficiently large, a system can, given a short evolution time, be effectively randomized. In some examples, a sampling device produces a sample from an available probability distribution that is governed by both thermal effects and quantum effects.

Any single spin variable may be up with a given probability, p, or down with the complementary probability, 1-p. The spin states of up and down with their associated probabilities define a probability distribution. Probability distributions can be built for systems of more spins. A set of spins can be a good model for a set of qubits, for example in a quantum processor.

If the probability distribution for one or more spin variables is known then the probability distribution can be sampled. Consider sampling for a single spin variable. A random number can be generated, $0 \leq u \leq 1$, and compared to the probability of up, p. If the random number is less than probability of up then the state of up can be recorded. The method can include assigning states to portions of the number line from 0 to 1. Each configuration can be associated with a portion of the line, and the length of the portion can be commensurate with the probability of the configuration. For larger systems of spin variables, each configuration of spins can be assigned to a portion of the number line. A random number can select a configuration, and the configuration can also be known as a state.

Each configuration in a set of spins can be associated with an energy. If the set of spins has local biases on some or all of the spins and is limited to two spin interactions, then conventionally the energy is represented as:

$$E(s_1 \ldots s_N) \propto \Sigma_i h_i s_i + \Sigma_{j>i} J_{ij} s_i s_j$$

Each configuration can have a respective probability. If the probability is Boltzmann, the probability can be expressed as follows:

$$p(s_1 \ldots s_N) = e^{-E(s_1 \ldots s_N)/k_B T}/Z$$

where T is temperature, and $k_B$ is the Boltzmann constant. The Boltzmann constant can be set to unity without loss of generality. The denominator, Z, is the partition function and is a normalization factor. It is a sum over all the configurations of the exponent of the negative energy divided by $k_B T$.

There can be several tasks in sampling that are comparable to one another in difficulty. A first task is counting the number of ground states. A second task is finding the probability that a qubit is up or down (i.e., finding the expectation value $E[s_i]$ for qubit i). A third task is finding the actual probability of a state. In some examples, this involves computing the partition function, Z. In some examples, this involves clamping variables.

A sampling device can accomplish sampling tasks in a variety of ways. In some examples, a sampling device includes a hybrid computer to perform at least some of the sampling tasks.

In a first method, a sampling device counts the number of ground states.

In some examples of the method, a sampling device performs three acts. Firstly, the sampling device repeatedly samples until a ground state is found. Secondly, the sampling device estimates the probability of the ground state. An example of an estimator is an expression that includes the inverse of the number of states found. Thirdly, the sampling device computes an estimate of the number of ground states as proportional to the inverse of the probability.

In other examples of the method, a sampling device performs four acts. In the first act, a sampling device collects a plurality of samples, $N_S$. In the next act, the sampling device counts the number of distinct ground states, $N_D$, from amongst the collected samples. In the third act, the sampling device counts the number of states or configurations appearing once, $N_O$. In the fourth act, the sampling device calculates and (optionally) returns an estimate of the number of ground states as follows:

$$N_{GS} \propto \frac{N_D}{1 - \frac{N_O}{N_S + 1}}$$

In some examples, finding the probability that a qubit is up or down is a task that may be completed using a direct approach. In the direct approach, a sampling device collects a series of samples from the qubit. The sampling device counts how many times the qubit has (or is in) a given state relative to the number of samples. This amounts to finding the expectation value $E[s_i]$ for qubit i, and is equivalent to finding the probability distribution for qubit i. This approach can be used to find the probability of a state.

One approach to finding the actual probability of a state involves computing the partition function, Z. In practice, this can be difficult because the partition function is the sum over all configurations of the exponential of the negative of temperature normalized energy. As a set of spins has exponentially many configurations, this computation can become impractical for even powerful conventional computers as the number of spins grows. However, there are practical approaches such as the clamping of variables in which to find the probability of a given configuration, $s_1 \ldots s_N$, a hybrid computer first finds or estimates the probability distribution of a first spin. The sampling device then fixes the first spin, and estimates the probability of the reduced system $s_2 \ldots s_N$. The enumeration of the spins can be arbitrary.

A plurality of different terms or parameters characterize or define a sampling process. These terms correspond to different levels of abstraction of the sampling process. At the highest level of abstraction, a sampling device provides samples from a target probability distribution. The target probability distribution can be based on a function, such as, an objective function. The objective function can have many states, and the target probability distribution can specify the likelihood of occupation of the states. There are times when it is can be advantageous to consider the lower level details of how a sampling device derives samples from an available probability distribution.

The available distribution, in some examples, is implemented on an analog processor (e.g., a quantum processor). For a quantum processor, the implementation can involve specifying a problem Hamiltonian. The problem Hamiltonian can correspond to an objective function as described above. For some quantum processors, the problem Hamiltonian can be reduced to a set of local bias values and a set of coupling values. However, the processor can, as an imperfect device, implement an actual problem Hamiltonian that is a permuted set of local bias values and coupling values. The sample returned from the processor corresponds to the actual problem Hamiltonian, the exact form of which is generally unknown. An energy spectrum from the problem Hamiltonian can inform the available probability distribution.

Figure 2:
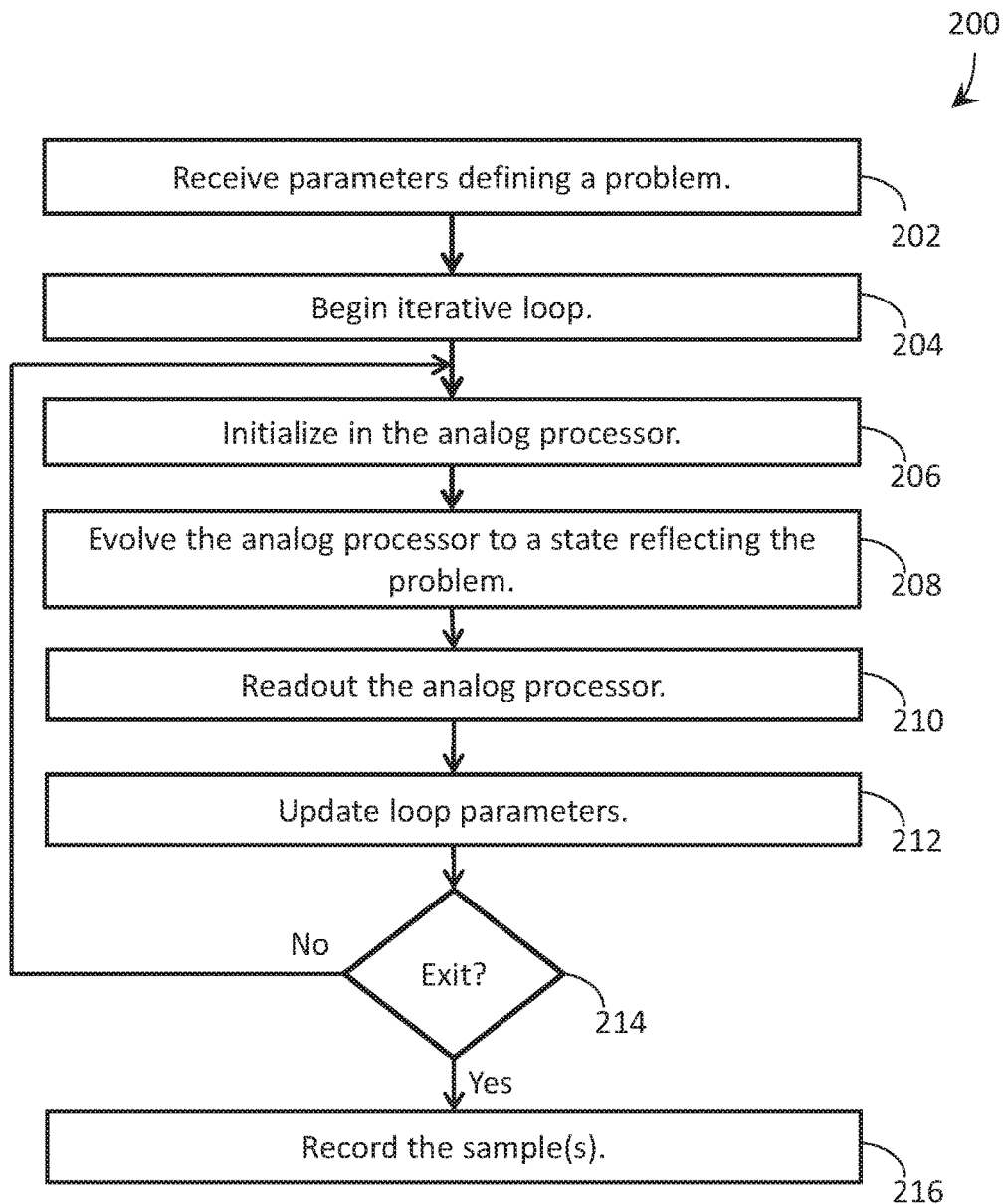
FIG. 2 shows a method executable by circuitry to create a sample for a set of variables from a function for the purpose of illustrating the process of sampling.

FIG. 2 shows a method 200 executable by circuitry to create a sample for a set of variables from a function for the purpose of illustrating the process of sampling. One or more of these acts may be performed by or via one or more circuits, for instance one or more hardware processors. In some examples, a sampling device including a hybrid computer performs the acts in method 200.

At 202, a sampling device receives a set of parameters defining the sampling process. In some examples, the set of parameters includes an objective function. In some implementations, the set of parameters includes a problem Hamiltonian that implements the objective function. In some implementations, the set of parameters includes a number of samples to be drawn, and additional parameters such as annealing time. In some implementations, the set of parameters includes an indication to select one or more of a set of previously received parameters, or parameters that were otherwise provided previously. In some examples, a parameter is selected by default.

At 204, the sampling device begins, or continues, an iterative loop, such as a "for" loop. The iteration is over the number of samples. At 206, the sampling device initializes an analog processor in a ground state of the initial Hamiltonian. The initial Hamiltonian is selected because its ground state is generally accessible. The initial Hamiltonian is, during act 204, the instant Hamiltonian of the analog processor. An example initialization Hamiltonian includes off-diagonal single-qubit terms.

At 208, the analog processor, as described by its instant Hamiltonian, is evolved toward a problem Hamiltonian. At 210, the analog processor provides a read-out. In some implementations, the results of the read-out are returned to a controller or a digital processor. In some implementations, the results of the read-out are stored.

At 212, the sampling device updates the control variables for the iterative loop (e.g. the counter in the "for" loop). At 214, the sampling device tests the variables used to control the loop to determine if the method should exit the loop. Upon determining not to exit the loop, control of method 200 returns to 206, and processing by the sampling device continues as before. Upon determining to exit the loop, control of method 200 proceeds to 216, and the sampling device records the sample (or the plurality of samples) obtained during iterative execution of loop 206-214.

In some implementations, the sampling device orders (i.e., places in sequence) the plurality of samples by energy value. Energy value can be a proxy for quality of solution.

Figure 3:
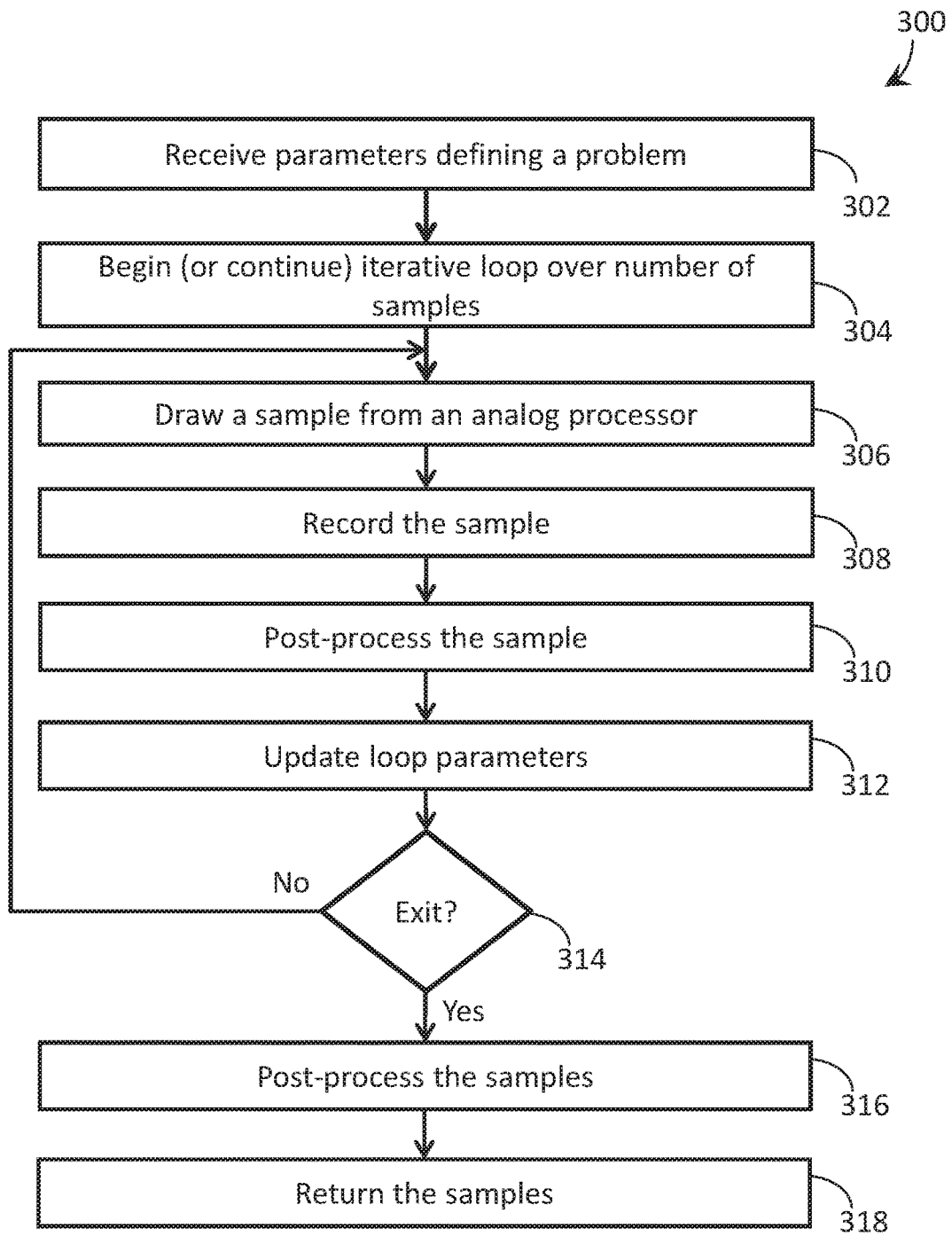
FIG. 3 shows a method executable by circuitry to create a plurality of samples for a set of variables from an objective function with the use of post-processing.

FIG. 3 shows a method 300 executable by circuitry to create a plurality of samples for a set of variables from an objective function with the use of post-processing. One or more of these acts may be performed by or via one or more circuits, for instance one or more hardware processors. In some examples, a sampling device including a hybrid computer (such as hybrid computer 800 of FIG. 8) performs the acts in method 300.

At 302, a sampling device receives a set of parameters defining in part the sampling process in method 300. In some implementations, the set of parameters includes an objective function. In some implementations, the set of parameters includes a problem Hamiltonian that implements an objective function. In some implementations, the set of parameters includes a number of samples to be drawn, and additional parameters such as annealing time. In some implementations, the set of parameters includes an indication to select one or more of a set of previously received parameters, or parameters that were otherwise provided previously. In some examples, a parameter is selected by default.

At 304 the sampling device begins, or continues, an iterative loop, such as a "for" loop. The iteration is over the number of samples. At 306, the hybrid computer draws a sample from an analog processor (such as quantum processor 832 of FIG. 8), and, at 308, records the sample.

At 310, optionally, the sampling device post-processes the sample, i.e., the sampling device performs (or requests another processor to perform) one or more post-processing operations. In some implementations, the other processor is a digital processor. Examples of the one or more post-processing operations include: a majority voting post-processing operation, a greedy descent post-processing operation, a variable clamping post-processing operation, a variable branching post-processing operation, or a local field voting post-processing operation. Post processing operations may be implemented on one or more of a microprocessor, a digital signal processor (DSP), a graphical processing unit (GPU), a field programmable gate array (FPGA), or other circuitry.

At 312, the sampling device updates the control variables for the iterative loop (e.g. the counter in the "for" loop). At 314, the sampling device tests the variables used to control the loop to determine if the method should exit the loop. Upon determining not to exit the loop, control of method 300 returns to 306, and processing by the sampling device continues as before. Upon determining to exit the loop, control of method 300 proceeds to 316.

At 316, optionally, the sampling device post-processes the plurality of samples. When using GPUs, matrix-matrix operations on batches can be more efficient than matrix-vector operations on a single sample. It can be advantageous to post-process an entire sampling batch at a time, rather than sample-by-sample.

In some implementations, the sampling device receives the plurality of samples, and causes an execution of at least one post-processing operation on at least one respective sample in the plurality of samples via at least one post-processing non-quantum processor-based device. In some implementations, a post-processing non-quantum processor-based device includes a microprocessor, a DSP, a GPU, a FPGA, or other circuitry.

In post-processing the plurality of samples at 316, the sampling device adjusts the plurality of samples as needed such that the plurality of samples reflects a desirable aggregate value. In some implementations, one sample in the plurality of samples is adjusted. In other implementations, the sampling device adjusts two or more samples in the plurality of samples. In some implementations, the desired aggregate is a statistical value from the plurality of samples. Examples of a statistical value include a first order moment, second order moment, and so on, of the plurality of samples or a distribution. For example, the sampling device uses post-processing to match the mean and variance for the plurality of samples to the mean and variance for a target distribution. In some examples, the sampling device changes a representative sample in the plurality of samples such that an aggregate value for the plurality of samples converges on an aggregate value for a target distribution.

In some implementations, the sampling device adjusts the plurality of samples such that the plurality of samples is further equilibrated at a desired temperature. For example, the sampling device partitions the samples into two halves of a bipartite set. The sampling device performs local updates on a first half. Then the sampling device performs local updates on a second half. As the qubits are bipartite, the local updates to one half do not affect the qubits in the same half but affect the qubits in the other half. Examples of local updates include: Gibbs sweeping, Metropolis method, locally tree like updates, and the like. The post-processing by the sampling device at 316 allows the plurality of samples to equilibrate to a desired temperature set in the post-processing process. The temperature can be cooler, the same, or warmer than the temperature associated with the sample.

At 318, optionally, the sampling device returns the plurality of samples. In some implementations, the plurality of samples has been individually post-processed. In other implementations, the plurality of samples has been processed as a set.

In some implementations, at least one of method 200 or 300 can be used to find a set of local bias values and a set of coupling values such that the available probability distribution matches a target probability distribution.

Training Probabilistic Models

One difficulty that may be encountered when applying hardware, such as a quantum processor, to train probabilistic models is finding a tractable description of a hardware sampling distribution. The present application describes approaches to address this problem. The approaches can include training the hardware by matching the data statistics to the statistics of the hardware. In some implementations, training the hardware can include. adjusting the $h_i$ and $J_{ij}$ parameters of a quantum processor described above. The $h_i$ parameters are dimensionless local fields for the qubits in the quantum processor, and the $J_{ij}$ parameters are couplings between pairs of qubits.

Just as a Gaussian function can be fit to data by matching a mean and variance of the data, the hardware can be tuned to match moments of the data. It can be advantageous to do this in ways that make few assumptions about the hardware sampling distribution.

Approaches described in the present application include "blackbox matching" and "herding". Blackbox matching can yield a single estimate of the h and J parameters. Herding can provide a sequence of parameter estimates that, taken on average, yield the desired data statistics.

Blackbox Matching

Let $\Phi(s)$ be a feature vector, and $\overline{\Phi}=E_{data}[\Phi]$ be the expected statistics of the data. Let the joint set of hardware parameters be θ, where θ includes the h and J Ising parameters, and can also include additional parameters related to the hardware e.g. annealing schedule parameters.

For a setting of these parameters, define moments $m(\theta)=E_\theta[\Phi]$, where $m(\theta)$ can be obtained by sampling the hardware and using a frequency count estimate, for example. Moments can include a first moment (mean), a second moment (variance), and higher-order moments.

It can be desirable to seek to minimize a distance measure, for example $\|m(\theta)-\overline{\Phi}\|^2$ (a sum of squared differences between the moments and the data statistics), with respect to hardware parameters θ. A blackbox approach can be applied to the minimization problem by choosing not to assume any particular structure for $m(\theta)$.

A variety of methods can be applied to the minimization. One particular example is the SPSA algorithm [see e.g. Spall, J. C. (1992), *Multivariate Stochastic Approximation Using a Simultaneous Perturbation Gradient Approximation*, IEEE Transactions on Automatic Control, vol. 37(3), pp. 332341]. The number of hardware calls can be a bottleneck in training, and so it can be desirable to use a method that reduces the number of hardware calls.

Herding

One approach to finding a tractable description of the hardware sampling distribution is to run a herding algorithm using the hardware. Example suitable herding algorithms can be found in Chen Y. and Welling M., *Herding as a learning system with edge-of-chaos dynamics*, CoRR, abs/1602.03014, 2016. The present application describes herding methods for machine learning in the context of generating samples (generative models) and classification (discriminative models).

Generative Models—Matching Moments

Let $G=(V,E)$ be a hardware graph, where V denotes vertices of graph and E denotes edges of graph, and $n=|V|$. Let $\Phi:\{-1,1\}^n \to \mathbb{R}^m$ be a function that maps spin configurations into numbers. Each component of $\Phi$ is called a feature function, and is of the form $\alpha_i s_i$ for $i \in V$ or $\alpha_{i,j} s_i s_j$ for $\{i, j\} \in E$, and $\alpha_i, \alpha_{i,j} \in \mathbb{R}$.

Assume that we are given a vector of feature moments $\overline{\Phi} \in \mathbb{R}^m$ over an unknown distribution on the set of spin configurations, that is, $\overline{\Phi}=E(\Phi(s))$, where s is a random variable on $\{-1,1\}^n$ with unknown distribution. A goal is to produce samples such that the sample moments approximate $\overline{\Phi}$.

One approach is to first estimate the parameters of the Markov Random Field (MRF) models by maximum likelihood/maximum entropy, and then sampling from the learned MRF to answer queries. Another approach is herding which directly generates pseudo-samples so as to asymptotically match the empirical moments of the data. Herding can generate pseudo-samples via recursion as described below.

An example herding method for generating samples to match given moments can be described as follows:

Initialize $w_0 \in \mathbb{R}^m$
for t=1 to T do
$s_t=\text{argmax}_s \langle w_{t-1}, \Phi(s) \rangle$ (using the hardware)
$w_t=w_{t-1}+(\overline{\Phi}-\Phi(s_t))$ (update the weights w)
Output: $s_1, \ldots, s_T$ (output sequence of samples)

The vector w can be a weighting vector. The weighting vector may also be referred to in the present description as the weights or the set of weights.

Notice that the third line in the method above can involve finding a solution to an Ising model. The solution can be obtained, for example, by calling the hardware. In some implementations, the hardware is a quantum processor.

As described above, an analog processor, such as a quantum processor, and in particular a quantum processor designed to perform quantum annealing and/or adiabatic quantum computation, may be operated as a sample generator, where the population can be possible states of the processor, and each sample can correspond to a state of the processor (i.e., a set of spin configurations). A common problem Hamiltonian includes a first component proportional to diagonal single qubit terms and a second component proportional to diagonal multi-qubit terms, and may be of the following form:

$$H_P \propto -\frac{\varepsilon}{2}\left[\sum_{i=1}^{N} h_i \sigma_i^z + \sum_{j>i}^{N} J_{ij}\sigma_i^z \sigma_j^z\right]$$

where N represents the number of qubits, $\sigma_i^z$ is the Pauli z-matrix for the $i^{th}$ qubit, $h_i$ and $J_{ij}$ are dimensionless local fields for the qubits, and couplings between qubits, and $\in$ is some characteristic energy scale for $H_P$.

In some implementations, the form of the Hamiltonian matches the form of the feature function described above where the feature function is of the form $\alpha_i s_i$ for $i \in V$ or $\alpha_{i,j} s_i s_j$ for $\{i, j\} \in E$, and $\alpha_i, \alpha_{i,j} \in \mathbb{R}$. The parameters $h_i$ and $J_{ij}$ can correspond to $\alpha_i$ and $\alpha_{i,j}$ respectively. The argmax operation in the method described above can advantageously be implemented using a quantum processor designed to perform quantum annealing and/or adiabatic quantum computation. In other implementations, where the form of the Hamiltonian does not match the form of the feature function, the argmax operation can be embedded on the hardware graph, and the hardware used to perform it. In yet other implementations, a digital processor and a quantum processor can be used in combination to perform the argmax operation.

The abbreviation argmax in the third line of the above method denotes the arguments of the maxima (i.e., the points of the domain of some function at which the function values are maximized). Whereas the term global maxima refers to the largest outputs of a function, argmax refers to the arguments (i.e., the inputs) at which the function outputs are as large as possible.

The argmax in the third line of the above method, and in the methods described below (with reference to FIGS. 4, 5, 6A, 6B, 7A, and 7B), determines the arguments of the points of the domain where the scalar product (dot product) of the two input vectors are maximized. This is indicated by the angle brackets in the notation. The notation $\langle u, v \rangle$ denotes the scalar product of vectors u and v. The scalar product is $\langle u, v \rangle = \Sigma_i u_i v_i$.

Each of the T spin configurations can be a sample. As T grows, the sample moments $(1/T)\Sigma_t \Phi(s_t)$ can approximate the target $\bar{\Phi}$ at a rate of $O(1/T)$.

It can be shown that herding is equivalent, or at least similar, to a Frank and Wolfe approach with specific step sizes for solving the mean square error $\min_{\Phi \in M}(\frac{1}{2})\|\Phi-\bar{\Phi}\|^2$, where M is the convex hull of $\Phi(s)$ for all spin configurations $s \in \{-1,1\}^n$. See, for example, Francis R. Bach, Simon Lacoste-Julien, and Guillaume Obozinski, *On the equivalence between herding and conditional gradient algorithms*, Proceedings of the 29th International Conference on Machine Learning, ICML 2012, Edinburgh, Scotland, UK, Jun. 26-Jul. 1, 2012, 2012.

In general, Frank and Wolfe approaches for estimating the mean square error can use the third line in the method above, and can be run using the hardware, for example the quantum processor. Different step-size updates can produce weighted samples with the same, or at least similar, convergence as above.

Herding can generate a sequence of points which give in sequence the descent directions of a conditional gradient method for minimizing the quadratic error on a moment vector. A benefit of herding is that it can generate a pseudo-sample whose distribution could approach the maximum entropy distribution with a given moment vector. The herding method can convert observed moments into a sequence of pseudo-samples. The pseudo-samples respect the moment constraints and may be used to estimate (unobserved) quantities of interest. The method advantageously allows sidestepping the usual approach of first learning a joint model (which is intractable) and then sampling from that model (which can easily get stuck in a local mode). Moreover, the method is fully deterministic (avoiding random number generation) and does not need expensive operations such as exponentiation. (See e.g. Welling, M., *Herding Dynamical Weights to Learn*, Proc. ICML, 2009)

Figure 4:
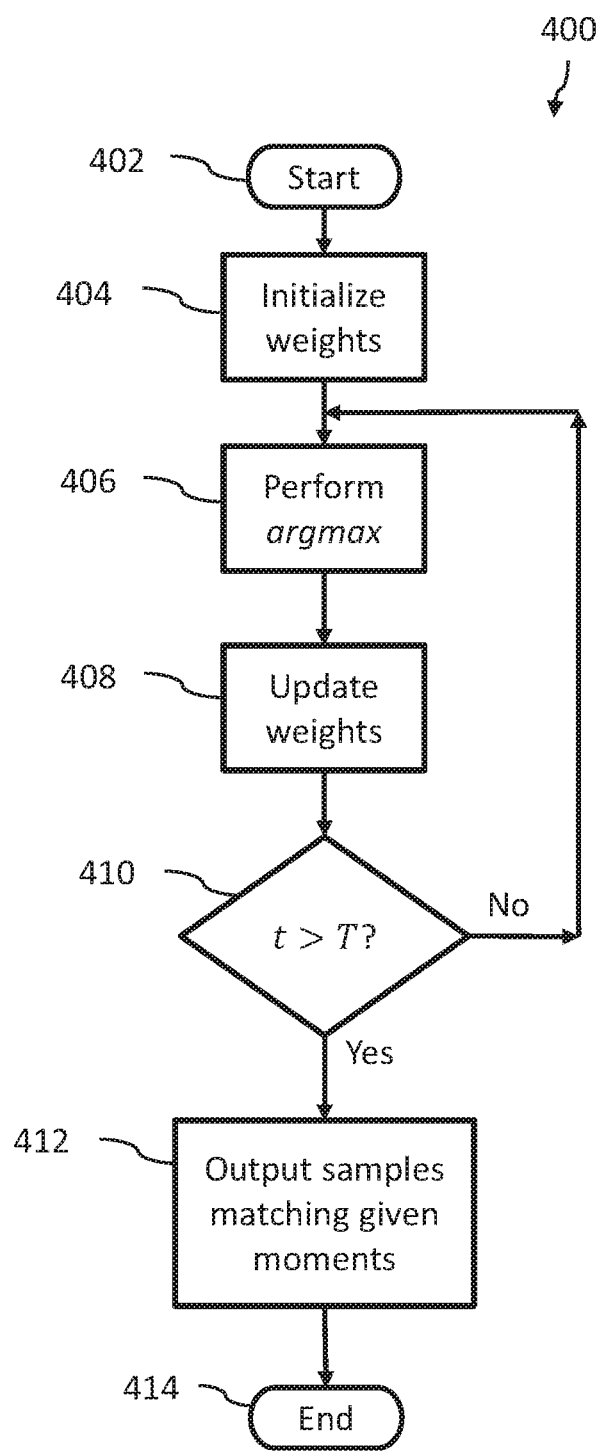
FIG. 4 is a flow chart illustrating a herding method for generating samples to match moments of a target distribution in accordance with the present systems, devices, articles, and methods, according to at least one implementation.

FIG. 4 is a flow chart illustrating a herding method 400 for generating samples to match moments of a target distribution in accordance with the present systems, devices, articles, and methods, according to at least one implementation. One or more of these acts may be performed by or via one or more circuits, for instance one or more hardware processors. In some examples, a sampling device including a hybrid computer such as hybrid computer 800 of FIG. 8 performs the acts in method 400.

Method 400 is initiated at 402, for example in response to user input. Method 400 includes gradient descent in its determination of the output sequence of samples. At 404, the weights are initialized. At 406, the hardware performs an argmax operation. As described above, the hardware can be an analog processor such as a quantum processor. At 408, the weights are updated. The weights can be updated based at least in part on the difference between the moments of the samples and the target moments. In one implementation, the weights are incremented by a difference between the vector of feature moments $\bar{\Phi}$ (the target) and the feature vector $\Phi(s)$. Upon determining, at 410, a further iteration is to be performed, control of method 400 returns to 406. Upon determining, at 410, not to perform another iteration, control of method 400 proceeds to 412, where the sequence of samples is output. The output may be stored in a datastore and/or provided to a user. Method 400 terminates at 414.

The relationship between the h and J Ising parameters and the weights w depends on the structure of the weights. Bunyk P. et al. *Architectural Considerations in the Design of a Superconducting Quantum Annealing Processor* IEEE Transactions on Applied Superconductivity, Vol. 24, No. 4, (August 2014) describe architectures of quantum processors. In some implementations, where the quantum processor has a Chimera architecture (see Bunyk P. et al, FIG. 1), the structure of w matches the structure of the hardware, and the variables are in $[-1,1]$, the diagonal of w is h, and the off-diagonal is J. In other implementations, where the structure of w does not match the structure of the quantum processor, then w may need to be embedded in the hardware, and the relationship between h and J, and w can be more complex.

Generative Models—Hidden Variable Models

For hidden variable models, spins (or qubits), s, can be partitioned into visible spins x and hidden spins z. We can write $s=(x,z)$. For convenience, let $p(s)=p(x, z)=x$ (the visible spins). While the hidden spins z are used in the method, they are typically not provided as output.

In hidden variable models, the moments $\bar{\Phi}$ are typically unknown. The input comprises a set of D observed values of visible variables as follows:

$$D = \{x^{(i)} : i=1 \ldots D\}$$

A goal is to generate samples x similar to the ones observed, taking advantage of the additional modeling power of the hidden variables. The feature functions are defined in the same way as above. An example method of operation of a computational system using herding for generating samples in hidden variable models is described as follows:

Initialize $w_0 \in \mathbb{R}^m$
for $t = 1$ to T do
  for $i = 1$ to D do
    $z_t^{(i)} = \mathrm{argmax}_z \langle w_{t-1}, \Phi(x^{(i)}, z) \rangle$ (using the hardware)
  $s_t = \mathrm{argmax}_s \langle w_{t-1}, \Phi(s) \rangle$ (using the hardware)

-continued $$w_t = w_{t-1} + (\bar{\Phi} - \Phi(s_t)) \text{ where } \bar{\Phi} = \frac{1}{D}\sum_{i=1}^{D}\Phi(x^{(i)}, z_t^{(i)})$$

Output: $p(s_1), \ldots, p(s_T)$

In this case, the output sample moments, $p(s_1)$, $p(s_2)$, ... $p(s_T)$, match the learned moments $(1/T)\Sigma_t(1/D)\Sigma_{i=1}^{D}\Phi(x^{(i)}, z_t^{(i)})$.

Hidden variables can be one way to accommodate sparse connectivity in the hardware. For example, the hardware graph may have insufficient connectivity to provide the moments. The introduction of hidden variables can increase the number of degrees of freedom. As described in the method above, argmax is performed for each set of observed values of the visible variables, i.e., argmax is performed D times for each t. At line 4, the method attempts to maximize over the hidden variables. At line 5, the hidden variables are fixed. At line 6, the weights w are updated.

Figure 5:
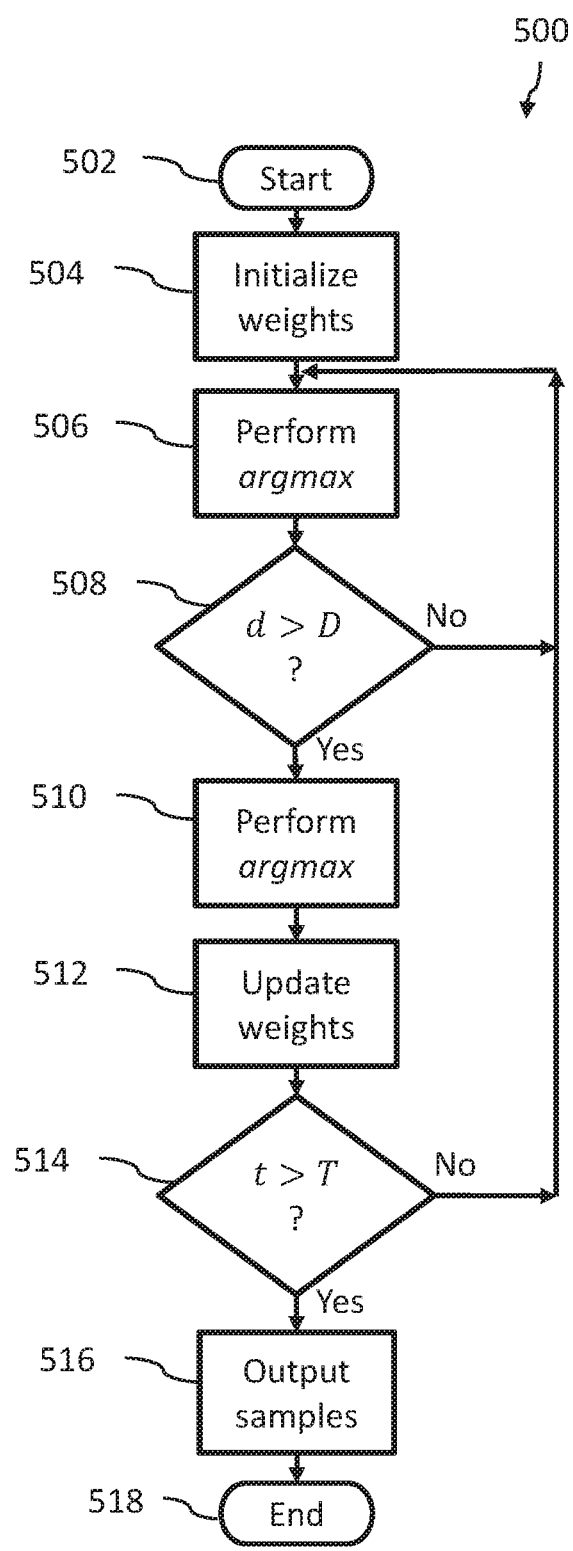
FIG. 5 is a flow chart illustrating a herding method for generating samples in hidden variable models to match moments of a target distribution in accordance with the present systems, devices, articles, and methods, according to at least one implementation.

FIG. 5 is a flow chart illustrating a herding method 500 for generating samples in hidden variable models to match moments of a target distribution in accordance with the present systems, devices, articles, and methods, according to at least one implementation. One or more of these acts may be performed by or via one or more circuits, for instance one or more hardware processors. In some examples, a sampling device including a hybrid computer such as hybrid computer 800 of FIG. 8 performs the acts in method 500.

Method 500 is initiated at 502, for example in response to user input. At 504, the weights are initialized. At 506, the hardware performs a first argmax operation. As described above, the hardware can be an analog processor such as a quantum processor. The first argmax operation is with respect to z, the hidden variables.

Upon determining, at 508, a further iteration with respect to the set of observed values of the visible variables ($1 \le d \le D$) is to be performed, control of method 500 returns to 506. Upon determining, at 508, not to perform another iteration, control of method 500 proceeds to 510 where the hardware performs a second argmax operation. The second argmax operation is with respect to the set of spin configurations s. At 512, the weights are updated as described above in reference to FIG. 4.

Upon determining, at 514, a further iteration is to be performed, control of method 500 returns to 506. Upon determining, at 514, not to perform another iteration, control of method 500 proceeds to 516, where the sequence of samples is output. The output may be stored in a datastore and/or provided to a user. Method 500 terminates at 518.

Discriminative Models

We consider discriminative models in which the data consists of pairs as follows:

$$D=\{(x^{(i)}, y^{(i)}) : i=1 \ldots D\}$$

where, in this case, for data point $(x^{(i)}, y^{(i)})$, $x^{(i)} \in \mathbb{R}^q$ corresponds to attributes while $y^{(i)} \in \{-1,1\}^n$ represents labels. In this example, the labels can be represented by a vector of binary values. A goal is to use the data D to learn a classifier that, for a new input x, predicts its labels y.

Matching Moments

Here, the feature function is $\Phi: \mathbb{R}^q \times \{-1,1\}^n \to \mathbb{R}^m$, and can be instantiated in some x. Herding in this case can consist of two phases—learning and prediction. The methods described below are herding for classification describes the learning phase in which one learns the weights w—see below. Given a new input x, its labels can be predicted, in the second phase, using the methods of operation of a computational system to perform herding for classification described below—one for learning and the other for prediction.

Learning:

Initialize $w_0 \in \mathbb{R}^m$
for t = 1 to T do
  for i = 1 to D do
    $\hat{y}_t^{(i)} = \text{argmax}_y \langle w_{t-1}, \Phi(x^{(i)}, y) \rangle$ (using the hardware)

$$w_t = w_{t-1} + \frac{1}{D}\sum_{i=1}^{D}[\Phi(x^{(i)}, y_t^{(i)}) - \Phi(x^{(i)}, \hat{y}_y^{(i)})] \text{ (update)}$$

Output: $w_1, \ldots, w_T$

Prediction:

Given $w_1, \ldots, w_T$ and input x
for t = 1 to T do
  $\hat{y}_t = \text{argmax}_y \langle w_{t-1}, \Phi(x, y) \rangle$ (using the hardware)
Output: most likely $\hat{y}_t$ (output most likely label given input x)

There are several ways to select the most likely label $\hat{y}_t$ in the above method, for example by picking the most frequent $\hat{y}_t$ overall, or by proceeding label by label.

Figure 6A:
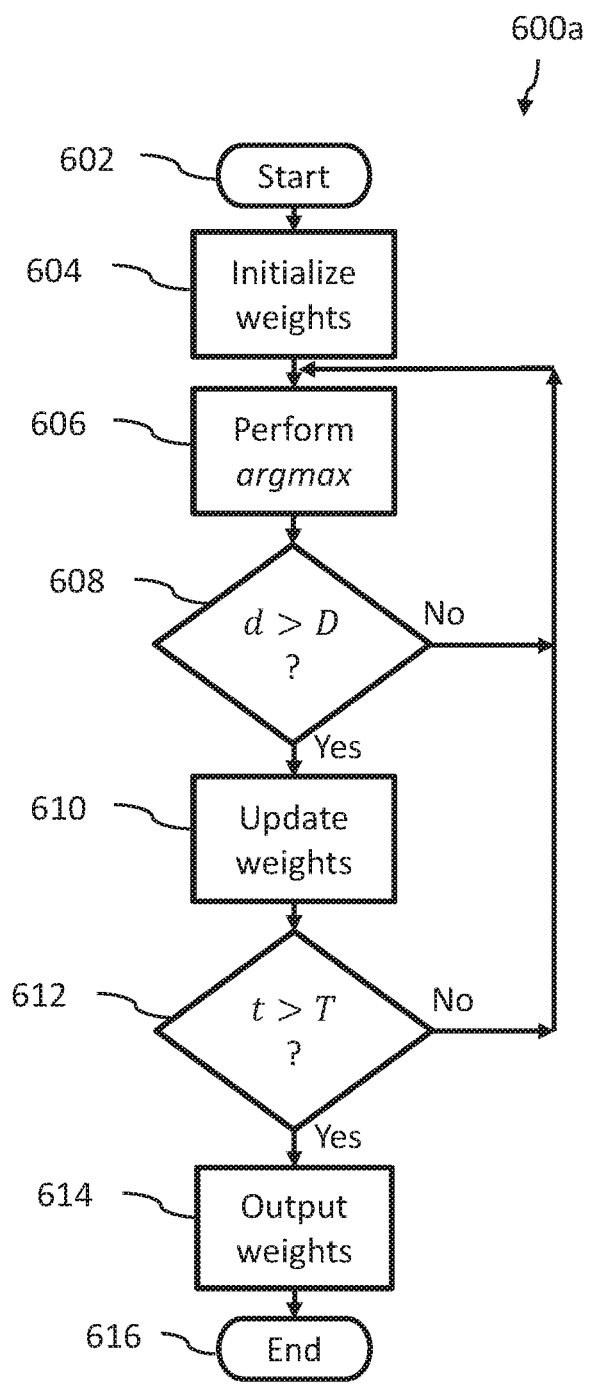
FIG. 6A is a flow chart illustrating a method of operation of a computational system for classification (learning phase) in accordance with the present systems, devices, articles, and methods, according to at least one implementation.

FIG. 6A is a flow chart illustrating a method 600a of operation of a computational system for classification in accordance with the present systems, devices, articles, and methods, according to at least one implementation. One or more of these acts may be performed by or via one or more circuits, for instance one or more hardware processors. In some examples, a sampling device including a hybrid computer such as hybrid computer 800 of FIG. 8 performs the acts in method 600a.

Method 600a is initiated at 602, for example in response to user input. At 604, the weights are initialized. At 606, the hardware performs a first argmax operation. The first argmax operation is with respect to y, the labels. The hardware can be an analog processor such as a quantum processor as described above in reference to FIG. 4.

Upon determining, at 608, a further iteration with respect to the set of observed values of the visible variables ($1 \le d \le D$) is to be performed, control of method 600a returns to 606. Upon determining, at 608, not to perform another iteration, control of method 600a proceeds to 610 where the weights are updated as described previously with reference to FIG. 4.

Upon determining, at 612, a further iteration is to be performed, control of method 600a returns to 606. Upon determining, at 612, not to perform another iteration, control of method 600a proceeds to 614, where the weights are output. The weights may be stored in a datastore and/or provided to a user. Method 600a terminates at 616.

Figure 6B:
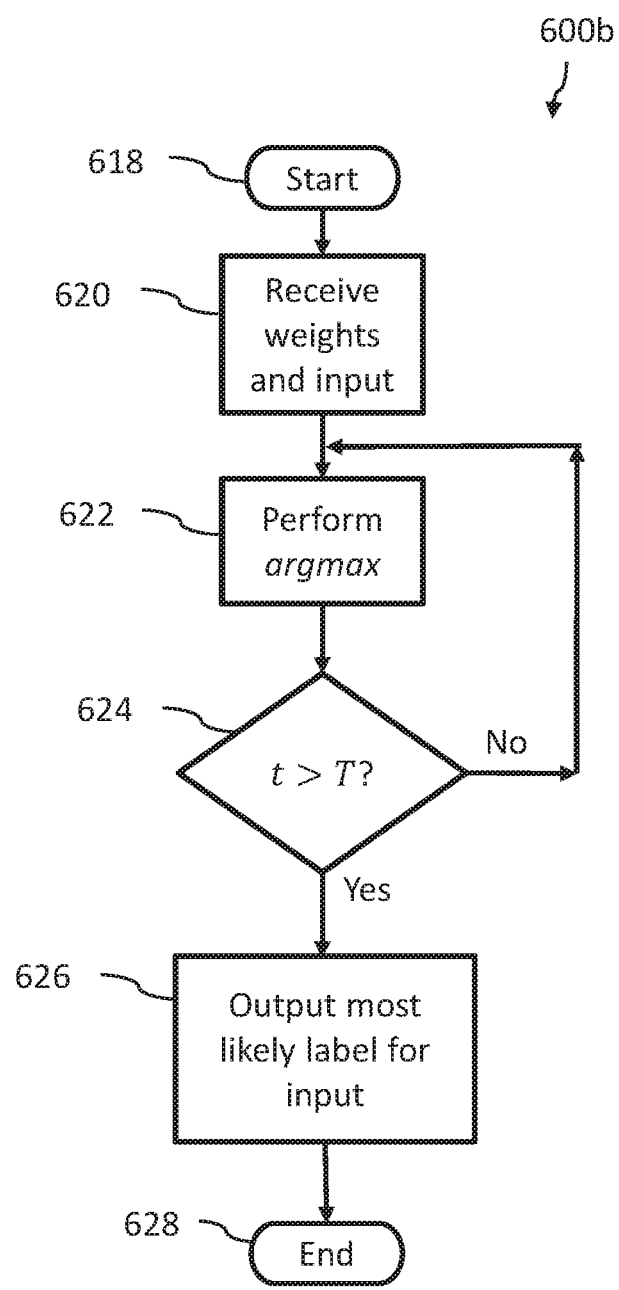
FIG. 6B is a flow chart illustrating a method of operation of a computational system for classification (prediction phase) in accordance with the present systems, devices, articles, and methods, according to at least one implementation.

FIG. 6B is a flow chart illustrating a method 600b of operation of a computational system for classification in accordance with the present systems, devices, articles, and methods, according to at least one implementation. One or more of these acts may be performed by or via one or more circuits, for instance one or more hardware processors. In some examples, a sampling device including a hybrid computer such as hybrid computer 800 of FIG. 8 performs the acts in method 600b.

Method 600b is initiated at 618, for example in response to user input. At 620, the weights and the input are received. At 622, the hardware performs an argmax operation. The hardware can be an analog processor such as a quantum processor as described above in reference to FIG. 4. Upon determining, at 624, a further iteration is to be performed, control of method 600b returns to 622. Upon determining, at 624, not to perform another iteration, control of method 600b proceeds to 626, where the most likely label is output. The output may be stored in a datastore and/or provided to a user. Method 600b terminates at 628.

Hidden Variable Models

Here, the settings are similar to, or the same as, in the previous section, but now the Ising variables y are partitioned into visible and hidden variables. We can write (z, y) for all the spins on the Ising model, y representing labels as before, and z corresponding to the hidden variables.

A method of operation of a computational system to perform herding for classification in hidden variable models is described as follows:

Initialize $w_0 \in \mathbb{R}^m$
for t = 1 to T do
  for i = 1 to D do
    $\hat{z}_t^{(i)} = \mathrm{argmax}_z \langle w_{t-1}, \Phi(x^{(i)}, z, y^{(i)}) \rangle$
    $(\check{z}_t^{(i)}, \hat{y}_t^{(i)}) = \mathrm{argmax}_{(z,y)} \langle w_{t-1}, \Phi(x^{(i)}, z, y) \rangle$ $$w_t = w_{t-1} + \frac{1}{D}\sum_{i=1}^{D}[\Phi(x^{(i)}, \hat{z}_t^{(i)}, y_t^{(i)}) - \Phi(x^{(i)}, \check{z}_t^{(i)}, \hat{y}_t^{(i)})]$$

Output: $w_1, \ldots, w_T$
Given $w_1, \ldots, w_T$ and input x
for t = 1 to T do
  $(\hat{z}_t, \hat{y}_t) = \mathrm{argmax}_{(z,y)} \langle w_{t-1}, \Phi(x, z, y) \rangle$ (using the hardware)
Output: most likely $\hat{y}_t$ Variants can include mini-batches and other tuning (see e.g. Chen Y. and Welling M., *Herding as a learning system with edge-of-chaos dynamics*, CoRR, abs/1602.03014, 2016), and parametric versions of herding (see e.g. Yutian Chen and Max Welling, Parametric herding, Proceedings of the Thirteenth International Conference on Artificial Intelligence and Statistics, AISTATS 2010, Chia Laguna Resort, Sardinia, Italy, May 13-15, 2010, pages 97-104, 2010).

Figure 7A:
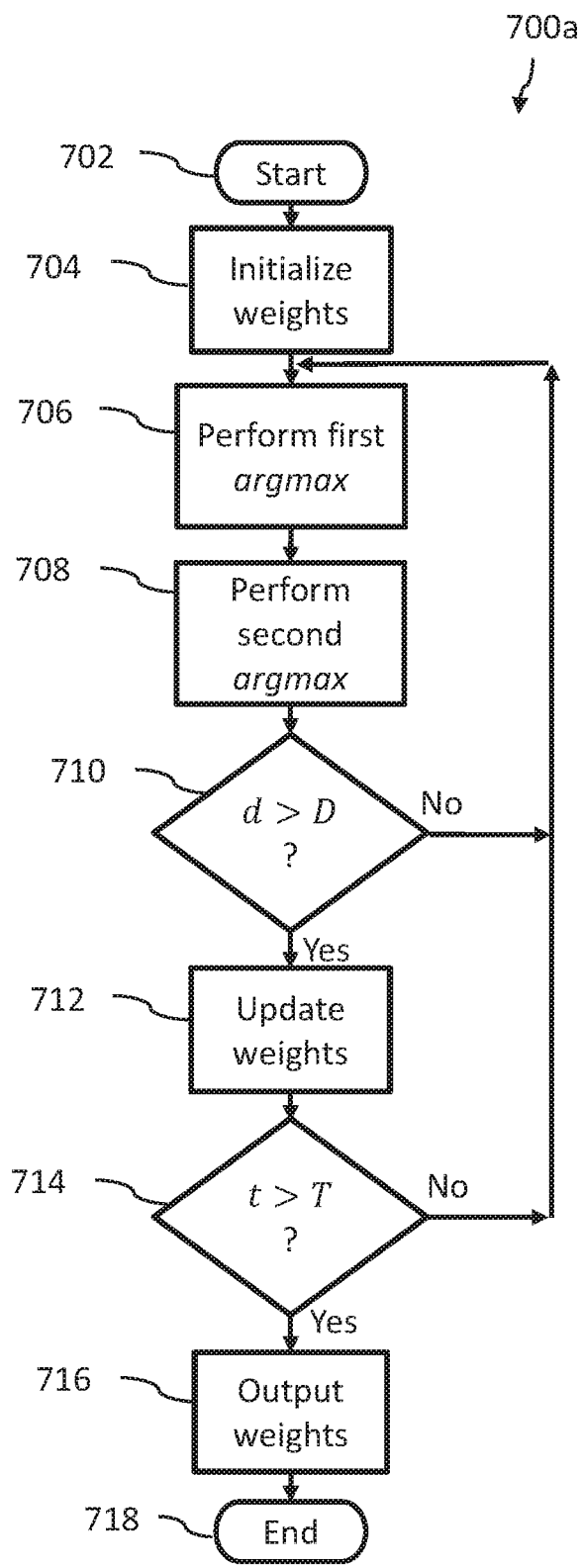
FIG. 7A is a flow chart illustrating a method of operation of a computational system for classification (learning phase) in hidden variable models in accordance with the present systems, devices, articles, and methods, according to at least one implementation.

FIG. 7A is a flow chart illustrating a method of operation of a computational system for classification (learning phase) in hidden variable models in accordance with the present systems, devices, articles, and methods, according to at least one implementation. One or more of these acts may be performed by or via one or more circuits, for instance one or more hardware processors. In some examples, a sampling device including a hybrid computer such as hybrid computer 800 of FIG. 8 performs the acts in method 700a.

Method 700a is initiated at 702, for example in response to user input. At 704, the weights are initialized. At 706, the hardware performs a first argmax operation. The first argmax operation is with respect to z, the hidden variables. The hardware can be an analog processor such as a quantum processor as described above in reference to FIG. 4. At 708, the hardware performs a second argmax operation. The second argmax operation is with respect to the labels y.

Upon determining, at 710, a further iteration with respect to the visible variables (1≤d≤D) is to be performed, control of method 700a returns to 706. Upon determining, at 710, not to perform another iteration, control of method 700a proceeds to 712, where the weights are updated as described above in reference to FIG. 4. Upon determining, at 714, a further iteration is to be performed, control of method 700a returns to 706. Upon determining, at 714, not to perform another iteration, control of method 700a proceeds to 716, where the weights are output. The weights may be stored in a datastore and/or provided to a user. Method 700a terminates at 718.

Figure 7B:
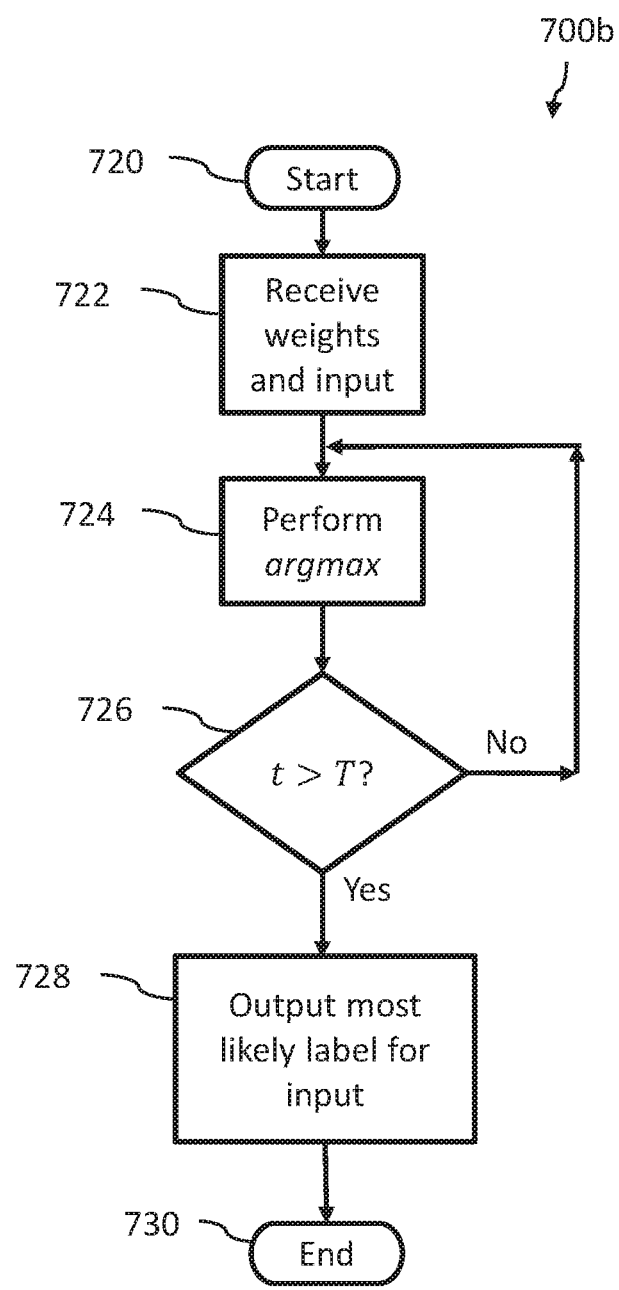
FIG. 7B is a flow chart illustrating a method of operation of a computational system for classification (prediction phase) in hidden variable models in accordance with the present systems, devices, articles, and methods, according to at least one implementation.

FIG. 7B is a flow chart illustrating a method of operation of a computational system for classification (prediction phase) in hidden variable models in accordance with the present systems, devices, articles, and methods, according to at least one implementation.

Method 700b is initiated at 720, for example in response to user input. At 722, the weights and the input are received. At 724, the hardware performs an argmax operation. The hardware can be an analog processor such as a quantum processor as described above in reference to FIG. 4. Upon determining, at 726, a further iteration is to be performed, control of method 700b returns to 724. Upon determining, at 726, not to perform another iteration, control of method 700b proceeds to 728, where the most likely label is output. The output may be stored in a datastore and/or provided to a user. Method 700b terminates at 730.

Machine Learning Using a Computational System

The present apparatus, systems, methods, and devices for machine learning can be implemented in a computational system comprising at least one processor. In one implementation, the computational system comprises a digital processor. In another implementation the computational system comprises a quantum processor. In yet another implementation, the computational system is a hybrid computing system comprises a digital processor and a quantum processor.

FIG. 8 is a block diagram of a hybrid computing system 800 in accordance with the present systems, devices, articles, and methods, according to at least one implementation. Hybrid computing system 800 is an example implementation comprising a quantum processor for implementing the methods described in the present disclosure.

Hybrid computing system 800 comprises a digital computer 802 coupled to an analog computer 804. In some implementations, analog computer 804 is a quantum computer and digital computer 802 is a classical computer. The exemplary digital computer 802 includes a digital processor (CPU) 806 that may be used to perform classical digital processing tasks described in the present systems and methods.

Digital computer 802 may include at least one system memory 808, and at least one system bus 810 that couples various system components, including system memory 808 to central processor unit 806.

The digital processor may be any logic processing unit, such as one or more central processing units ("CPUs"), graphics processing units ("GPUs"), digital signal processors ("DSPs"), application-specific integrated circuits ("ASICs"), field-programmable gate arrays ("FPGAs"), etc. Unless described otherwise, the construction and operation of the various blocks shown in FIG. 8 are of conventional design. As a result, such blocks need not be described in further detail herein, as they will be understood by those skilled in the relevant art.

Digital computer 802 may include a user input/output subsystem 812. In some implementations, the user input/output subsystem includes one or more user input/output components such as a display 814, mouse 816, and/or keyboard 818. System bus 810 can employ any known bus structures or architectures, including a memory bus with a memory controller, a peripheral bus, and a local bus. System memory 808 may include non-volatile memory, such as read-only memory ("ROM"), static random access memory ("SRAM"), Flash NAND; and volatile memory such as random access memory ("RAM") (not shown), all of which are examples of nontransitory computer- or processor-readable media. An basic input/output system ("BIOS") 820, which can form part of the ROM, contains basic routines that help transfer information between elements within digital computer 802, such as during startup.

Digital computer 802 may also include other non-volatile memory 822. Non-volatile memory 822 may take a variety of forms, including: a hard disk drive for reading from and writing to a hard disk, an optical disk drive for reading from and writing to removable optical disks, and/or a magnetic disk drive for reading from and writing to magnetic disks, all of which are examples of nontransitory computer- or processor-readable media. The optical disk can be a CD-ROM or DVD, while the magnetic disk can be a magnetic floppy disk or diskette. Non-volatile memory 822 may communicate with digital processor via system bus 810 and may include appropriate interfaces or controllers 824 coupled to system bus 810. Non-volatile memory 822 may serve as long-term storage for computer- or processor-readable instructions, data structures, or other data (also called program modules) for digital computer 802.

Although digital computer 802 has been described as employing hard disks, optical disks and/or magnetic disks, those skilled in the relevant art will appreciate that other types of non-volatile computer-readable media may be employed, such a magnetic cassettes, flash memory cards, Flash, ROMs, smart cards, etc., all of which are further examples of nontransitory computer- or processor-readable media. Those skilled in the relevant art will appreciate that some computer architectures conflate volatile memory and non-volatile memory. For example, data in volatile memory can be cached to non-volatile memory. Or a solid-state disk that employs integrated circuits to provide non-volatile memory. Some computers place data traditionally stored on disk in memory. As well, some media that are traditionally regarded as volatile can have a non-volatile form, e.g., Non-Volatile Dual In-line Memory Module variation of Dual In Line Memory Modules.

Various sets of computer- or processor-readable instructions (also called program modules), application programs and/or data can be stored in system memory 808.

In some implementations, system memory 808 may store post-processing (PP) instructions 826 suitable for implementing methods described in the present disclosure.

In some implementations, system memory 808 may store moment matching (MM) instructions 828 suitable for implementing methods described in the present disclosure.

In some implementations, system memory 808 may store runtime instructions 830 to provide executable procedures and parameters to deploy and/or monitor methods described in the present disclosure.

While shown in FIG. 8 as being stored in system memory 808, the instructions and/or data described above can also be stored elsewhere including in non-volatile memory 822 or one or more other non-transitory computer- or processor-readable media.

Analog computer 804 includes an analog processor 832 such as a quantum processor. Quantum processor 832 can include programmable elements such as qubits, couplers, and other devices. Quantum processor 832 can include superconducting qubits.

In accordance with some embodiments of the present systems and devices, quantum processor 832 can perform quantum annealing and/or adiabatic quantum computation.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other methods of quantum computation, not necessarily the exemplary methods for quantum computation generally described above.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet including U.S. provisional patent application Ser. No. 61/912,385 filed on Dec. 5, 2013, U.S. patent application Ser. No. 14/561,086 filed on Dec. 4, 2014, U.S. patent application Ser. No. 14/676,605 filed on Apr. 1, 2015, U.S. provisional patent application 62/322,116 filed on 13 Apr. 2016, and U.S. provisional patent application 62/304,737 filed on Mar. 7, 2016 are incorporated herein by reference, in their entirety. Aspects of the embodiments can be modified, if necessary, to employ systems, circuits, and concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for generative machine learning by a computational system comprising a quantum processor and a digital processor, the method comprising:
   for a first iteration of a first iterative loop:
      determining, by the quantum processor, a first set of spin configurations for which a scalar product of a first weighting vector and a feature vector attains a largest value, spins of the first set of spin configurations comprising a first set of visible spins and hidden spins; and
      updating the first weighting vector, by the digital processor, to form an updated weighting vector based at least in part on a difference between the feature vector evaluated at the first set of spin configurations and a vector of feature moments; and
   for a subsequent iteration of the first iterative loop:
      determining, by the quantum processor, a subsequent set of spin configurations for which a scalar product of a subsequent weighting vector and the feature vector attains a largest value, spins of the subsequent set of spin configurations comprising a subsequent set of visible spins and hidden spins; and
      updating the subsequent weighting vector, by the digital processor, based at least in part on a difference between the feature vector evaluated at the subsequent set of spin configurations and the vector of feature moments, the method further comprising:

for the first iteration of the first iterative loop, performing a first iteration of a second iterative loop, the second iterative loop nested in the first iterative loop, the second iterative loop performed over a plurality of sets of observed visible variables, the first iteration of the second iterative loop comprising:

determining, by the quantum processor, a first set of hidden variables for which the scalar product of the first weighting vector and the feature vector for a first set of the plurality of sets of observed visible spin configurations attains a largest value;

for the subsequent iteration of the first iterative loop, performing a second iteration of the second iterative loop:

determining, by the quantum processor, values of a second set of hidden variables for which the scalar product of the subsequent weighting vector and the feature vector for a second set of the plurality of sets of observed visible variables attains a largest value.

2. The method of claim 1, further comprising:
before performing the first iteration, initializing, by the digital processor, the first weighting vector.

3. The method of claim 2 wherein initializing the first weighting vector includes assigning the same value to each component of the first weighting vector.

4. The method of claim 1 wherein updating the first weighting vector based at least in part on a difference between the feature vector evaluated at the first set of spin configurations and a vector of feature moments includes updating the first weighting vector by forming a sum of a previous weighting vector and a difference between the vector of feature moments over a target distribution on a set of spin configurations and the feature vector evaluated at the first set of spin configurations.

5. The method of claim 1, further comprising:
defining a graph comprising a plurality of vertices V and a plurality of edges E; and
before performing the first iteration, defining the feature vector, the feature vector comprising one or more components, each component comprising a feature function that maps a set of spin configurations s into real numbers, each spin configuration associated with a respective vertex of the graph.

6. The method of claim 5, further comprising:
before performing the first iteration, receiving, by the digital processor, the vector of feature moments over a target distribution on the set of spin configurations.

7. The method of claim 5, wherein the set of spin configurations s is a random variable on $\{-1,1\}^n$ and the feature function is of the form $\alpha_i s_i$ for $i \in V$ or $\alpha_{i,j} s_i s_j$ for $\{i,j\} \in E$, and $\alpha_i$, $\alpha_{i,j}$ are real numbers.

8. The method of claim 1, further comprising:
following the subsequent iteration, outputting at least one set of the first set of spin configurations or the subsequent set of spin configurations by the digital processor.

9. A method for discriminative machine learning by a computational system comprising a quantum processor and a digital processor, the method comprising:
for a first iteration of a first iterative loop:
performing a first iteration of a second iterative loop, the second iterative loop nested in the first iterative loop, the second iterative loop performed over a plurality of sets of observed visible variables, the first iteration of the second iterative loop comprising:

determining, by the quantum processor, a first set of labels for which a scalar product of a first weighting vector and a feature vector for a first set of the plurality of sets of observed visible variables attains a largest value;

updating the first weighting vector, by the digital processor, to form an updated weighting vector based at least in part on an average discrepancy between the feature vector and a vector of feature moments, the average discrepancy determined over the plurality of sets of observed visible variables;

for a subsequent iteration of the first iterative loop:
performing a second iteration of the second iterative loop comprising:

determining, by the quantum processor, a second set of labels for which a scalar product of a subsequent weighting vector and the feature vector for a second set of the plurality of sets of observed visible variables attains a largest value;

updating the subsequent weighting vector, by the digital processor, to form an updated weighting vector based at least in part on an average discrepancy between the feature vector and the vector of feature moments, the average discrepancy determined over the plurality of sets of observed visible variables; and outputting at least one of the weighting vectors.

10. The method of claim 9, further comprising:
receiving an input vector; and
determining the most likely label for the input vector.

11. The method of claim 10 wherein determining the most likely label for the input vector includes performing a plurality of iterations of a third iterative loop over each of the output weighting vectors, each iteration comprising determining, by the quantum processor, a label for which the scalar product of the respective weighting vector and the feature vector attains a largest value.

12. The method of claim 10, further comprising:
for the first iteration of the first iterative loop, and the first iteration of the second iterative loop:
determining, by the quantum processor, a first set of hidden variables for which the scalar product of the first weighting vector and the feature vector for a first set of the plurality of sets of observed visible variables attains a largest value; and
for the subsequent iteration of the first iterative loop, and the second iteration of the second iterative loop:
determining, by the quantum processor, a second set of hidden variables for which the scalar product of the subsequent weighting vector and the feature vector for a second set of the plurality of sets of observed visible variables attains a largest value.

* * * * *